US011764497B2

(12) United States Patent
Honma et al.

(10) Patent No.: US 11,764,497 B2
(45) Date of Patent: Sep. 19, 2023

(54) ELECTRICAL CONNECTION CASSETTE

(71) Applicants: FURUKAWA ELECTRIC CO., LTD., Tokyo (JP); FURUKAWA AUTOMOTIVE SYSTEMS INC., Shiga (JP)

(72) Inventors: Hisao Honma, Inukami-gun (JP); Hiroaki Rikihisa, Tokyo (JP)

(73) Assignees: FURUKAWA ELECTRIC CO., LTD., Tokyo (JP); FURUKAWA AUTOMOTIVE SYSTEMS INC., Inukami-gun (JP)

(*) Notice: Subject to any disclaimer, the term of this patent is extended or adjusted under 35 U.S.C. 154(b) by 0 days.

(21) Appl. No.: 17/575,182

(22) Filed: Jan. 13, 2022

(65) Prior Publication Data

US 2022/0140502 A1   May 5, 2022

Related U.S. Application Data

(60) Division of application No. 16/424,787, filed on May 29, 2019, now Pat. No. 11,258,191, which is a
(Continued)

(30) Foreign Application Priority Data

Nov. 30, 2016   (JP) .................. 2016-233281

(51) Int. Cl.
*H01R 12/00* (2006.01)
*H01R 9/22* (2006.01)
(Continued)

(52) U.S. Cl.
CPC ......... *H01R 9/226* (2013.01); *B60R 16/0207* (2013.01); *H01R 9/2458* (2013.01); *H01R 29/00* (2013.01)

(58) Field of Classification Search
CPC ............ H01R 13/6658; H01R 23/7068; H01R 23/684; H01R 9/226; H01R 9/2458;
(Continued)

(56) References Cited

U.S. PATENT DOCUMENTS 2,726,375 A * 12/1955 Gordon ................ H01R 9/2408
439/717
3,537,061 A * 10/1970 Haag .................... H01R 13/514
439/518

(Continued)

FOREIGN PATENT DOCUMENTS

CN   103004030 A   3/2013
JP   5-501782   4/1993
(Continued)

OTHER PUBLICATIONS

Combined Chinese Office Action and Search Report dated Feb. 14, 2020 in Patent Application No. 201780073906.8 (with unedited computer generated English translation), 14 pages.
(Continued)

*Primary Examiner* — Thanh Tam T Le
(74) *Attorney, Agent, or Firm* — Oblon, McClelland, Maier & Neustadt, L.L.P.

(57) ABSTRACT

Provided is an electrical connection cassette with which it is possible to freely expand a device and add functions in accordance with the size of free space. An electrical connection cassette is provided with: a circuit board; and first connection terminals and second connection terminals mounted on the circuit board and having terminal shapes that can be engaged with each other. In a state with a terminal connection direction oriented in a predetermined direction with respect to the circuit board, the first connection terminals are disposed on the side of one main surface of the circuit board, and in a state with a terminal connection direction oriented in a direction parallel to the predetermined
(Continued)

direction, the second connection terminals are disposed near the other main surface of the circuit board.

11 Claims, 25 Drawing Sheets

Related U.S. Application Data continuation of application No. PCT/JP2017/042734, filed on Nov. 29, 2017.

(51) Int. Cl.
*B60R 16/02* (2006.01)
*H01R 9/24* (2006.01)
*H01R 29/00* (2006.01)

(58) Field of Classification Search
CPC .. H01R 29/00; H05K 7/026; H01H 2085/208; B60R 16/0207
See application file for complete search history.

(56) References Cited

U.S. PATENT DOCUMENTS

| | | | |
|---|---|---|---|
| 3,648,115 A | | 3/1972 | Teagno |
| 3,771,104 A | * | 11/1973 | Clark ............... H01R 4/24 439/717 |
| 3,883,856 A | | 5/1975 | Saito |
| 4,135,226 A | | 1/1979 | Kourimsky |
| 4,255,004 A | | 3/1981 | Kourimsky |
| 4,322,120 A | | 3/1982 | Rilling |
| 4,380,360 A | | 4/1983 | Parmer |
| 4,423,465 A | * | 12/1983 | Teng-Ching ......... H05K 5/0021 361/744 |
| 4,611,879 A | * | 9/1986 | Bullard ............... H01R 13/514 439/717 |
| 4,669,795 A | | 6/1987 | Bonhomme |
| 4,725,250 A | | 2/1988 | Kuhn |
| 4,897,054 A | * | 1/1990 | Gilissen ............. H01R 12/7082 439/631 |
| 5,046,955 A | | 9/1991 | Olsson |
| 5,584,728 A | | 12/1996 | Cheng |
| 5,658,158 A | | 8/1997 | Milan |
| 5,873,743 A | | 2/1999 | Tkazyik |
| 5,951,306 A | | 9/1999 | Millhimes |
| 6,254,435 B1 | | 7/2001 | Cheong |
| 6,568,943 B2 | | 5/2003 | Okayasu |
| 6,780,018 B1 | | 8/2004 | Shipe |
| 6,875,923 B2 | | 4/2005 | Egawa |
| 7,172,436 B2 | | 2/2007 | Uezono |
| 7,270,551 B2 | * | 9/2007 | Busse ............. H04Q 1/146 439/912 |
| 7,413,481 B2 | * | 8/2008 | Redmond, III ...... H01R 13/514 439/717 |
| 7,591,653 B2 | | 9/2009 | Boileau |
| 7,905,732 B2 | | 3/2011 | Chung |
| 8,027,168 B2 | | 9/2011 | Senk |
| 8,062,071 B2 | | 11/2011 | Yamakami |
| 8,074,680 B2 | | 12/2011 | De Carolis |
| 8,303,324 B2 | | 11/2012 | Franke |
| 8,529,297 B2 | | 9/2013 | Chang |
| 8,884,169 B2 | | 11/2014 | Jozwiak |
| 9,024,209 B2 | | 5/2015 | Ellegaard |
| 9,033,749 B2 | | 5/2015 | Seberger |
| 11,258,191 B2 | * | 2/2022 | Honma ............. H01R 9/226 |
| 2002/0009925 A1 | | 1/2002 | Sato |
| 2007/0270006 A1 | | 11/2007 | Herges |
| 2011/0176281 A1 | | 7/2011 | Ikemoto et al. |

FOREIGN PATENT DOCUMENTS

| | | |
|---|---|---|
| JP | 2000-150054 | 5/2000 |
| JP | 2002-100436 | 4/2002 |
| JP | 2006-156257 | 6/2006 |
| JP | 2008-516844 | 5/2008 |
| JP | 4519200 | 8/2010 |
| JP | WO 2011/121739 A1 | 10/2011 |
| JP | 2012-038323 | 2/2012 |
| WO | WO 97/08786 A1 | 3/1997 |
| WO | WO 2014/076987 A1 | 5/2014 |

OTHER PUBLICATIONS

Japanese Office Action dated Mar. 15, 2021 in Japanese Patent Application No. 2018-554178 w/English translation, 16 pages.
Office Action dated Nov. 17, 2021 in Japanese Patent Application No. 2018-554178 with English translation, 9 pages.
International Search Report dated Jan. 30, 2018 in PCT/JP2017/042734, filed on Nov. 29, 2017 (with English Translation).

* cited by examiner

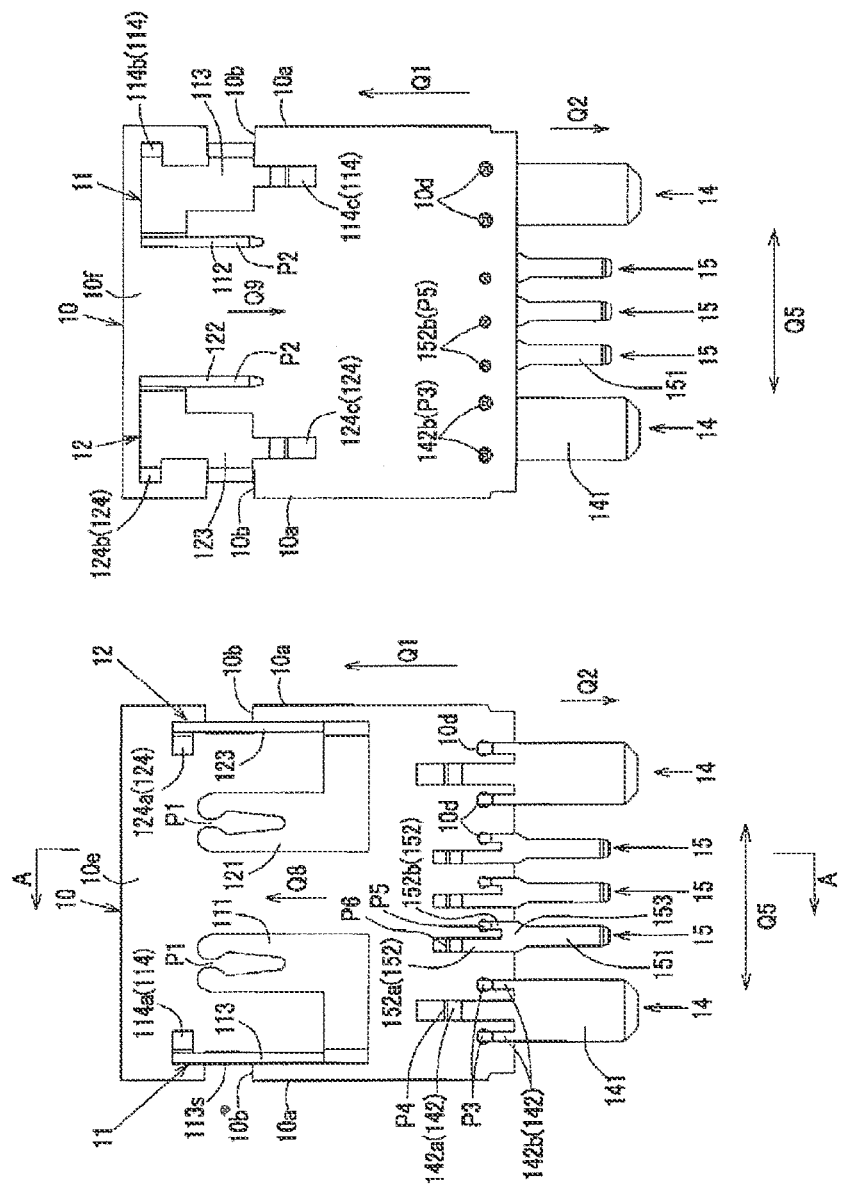

ELECTRICAL CONNECTION CASSETTE

CROSS REFERENCE TO RELATED APPLICATIONS

This application is a divisional of U.S. patent application Ser. No. 16/424,787, filed May 29, 2019, which is a continuation of International Application No. PCT/JP2017/042734, filed Nov. 29, 2017, and claims priority to Japanese Priority Application No. 2016-233281, filed Nov. 30, 2016. The entire contents of the above-identified applications are incorporated herein by reference.

TECHNICAL FIELD

The disclosure relates to an electrical connection cassette for monitoring power supplied to an onboard device.

BACKGROUND ART

In the related art, a vehicle such as an automobile is equipped with an electrical connection box (so-called a fuse/relay box) for distributing power from a power source to onboard devices and monitoring the distributed power (for example, PTL 1). In recent years, the electrical connection box tends to be enlarged by being equipped with a wider variety of functions (e.g., fuse function, relay function, voltage monitoring function, filter function, backup capacitor function, and the like). Therefore, it has become difficult to ensure an arrangement space for the electrical connection box within the vehicle.

In order to suppress the enlargement of such an electrical connection box, it is desired that the various functions in the electrical connection box be separated therefrom as functions in another device and be transferred to a small free space that is present in the route of a wire harness distribution path or in the vicinity of an onboard device.

However, because the size of the free space varies depending on the location, there is a demand for a device that can freely change the device size (in other words, the type and number of functions to be transferred) in accordance with the size of the free space.

CITATION LIST

Patent Literature

PTL 1: WO2014/076987A 1

SUMMARY

Technical Problem

Therefore, an object of the disclosure is to provide an electrical connection cassette that can freely expand a device and add functions in accordance with the size of a free space.

Solution to Problem

The disclosure is an electrical connection cassette including: a circuit board; and a first connection terminal and a second connection terminal mounted on the circuit board and having terminal shapes capable of engaging with each other, the first connection terminal being disposed on a side of one main surface of the circuit board in a state in which a terminal connection direction is oriented in a predetermined direction with respect to the circuit board, and the second connection terminal being disposed on a side of another main surface of the circuit board in a state in which a terminal connection direction is oriented in a direction parallel to the predetermined direction.

Note that the mounting of the first connection terminal and the second connection terminal on the circuit board includes not only a direct mounting on the circuit board, but also an indirect mounting on the circuit board via other members.

The "terminal connection direction" of the first connection terminal is a direction in which the first connection terminal is relatively closer to the mating connection terminal when the first connection terminal connects with the mating connection terminal. The "terminal connection direction" of the second connection terminal is also similar to the "terminal connection direction" of the first connection terminal.

According to this configuration, since the first connection terminal and the second connection terminal each have a terminal shape that can be engaged with each other, the electrical connection cassettes can be electrically connected to each other by connecting the first connection terminal and the second connection terminal to each other between the electrical connection cassettes. Accordingly, the same type of electrical connection cassettes having the same or different functions can be connected to each other to provide an electrical connection cassette that can freely expand the device and add functions in accordance with the size of the free space.

Since the first connection terminal and the second connection terminal are respectively disposed on one main surface and the other main surface of the circuit board, the circuit board can be arranged in the thickness direction when the electrical connection cassettes are connected to each other, which makes it possible to connect the electrical connection cassettes together in a compact manner.

Because the terminal connection directions of the first connection terminal and the second connection terminal are oriented in a direction parallel to the predetermined direction, when the electrical connection cassettes are connected to each other, the connection direction between the electrical connection cassettes is easily recognized, and the connection workability of connecting the electrical connection cassettes to each other can be improved.

An aspect of the disclosure may include a metal member having the first connection terminal, the second connection terminal, and a connecting portion which connects the first connection terminal and the second connection terminal.

With this configuration, in the metal member, the first connection terminal and the second connection terminal are integrated by the connecting portion, so the number of parts can be reduced and assembly workability for assembling the electrical connection cassette can be improved, and the first connection terminal and the second connection terminal can be reliably conducted.

As an aspect of the disclosure, one connection terminal of the first connection terminal and the second connection terminal may be a convex terminal, and the other connection terminal may be a concave terminal.

According to this configuration, by configuring the first connection terminal and the second connection terminal as the convex terminal and the concave terminal, respectively, the first connection terminal and the second connection terminal can be connected to each other with a simple structure.

Moreover, as an aspect of the disclosure, the first connection terminal and the second connection terminal each may be formed in a plate shape, and a main surface of one connection terminal of the first connection terminal and the second connection terminal may be disposed perpendicular to the circuit board, and a main surface of the other connection terminal of the first connection terminal and the second connection terminal may be disposed parallel to the circuit board.

Note that the "perpendicular direction" described above is not limited to a perpendicular direction in a strict sense, but also includes a direction offset within a certain range around the vertical direction (e.g., a direction that appears to be roughly perpendicular). The "parallel direction" described above is also similar to the "perpendicular direction" described above.

According to this configuration, the first connection terminal and the second connection terminal are arranged in a suitable configuration when the terminal shapes are connected to each other by intersecting the main surfaces thereof, and the first connection terminal and the second connection terminal can be connected to each other with a simple structure. The terminal shape suitable for such an arrangement may be, for example, a case where the first connection terminal is a tuning-fork shaped terminal and the second connection terminal is a tab shaped terminal, or a case where the first connection terminal and the second connection terminal may both have the shape of a tuning-fork terminal.

As an aspect of the disclosure, a position of the first connection terminal with respect to the circuit board and a position of the second connection terminal with respect to the circuit board may coincide in a front view of a main surface of the circuit board.

Note that the "position of the first connection terminal" described above is, for example, a connection position of a connection portion of the mating connection terminal at the connection portion of the first connection terminal (more specifically, a predetermined position within the connection portion (for example, the center position)). The "position of the second connection terminal" described above is also similar to the position of the first connection terminal described above.

This configuration allows each electrical connection cassette to be prevented from being misaligned in a direction parallel to a main surface of the circuit board while the electrical connection cassettes are connected to each other. As a result, the electrical connection cassettes can be compactly connected with each other.

An aspect of the disclosure may include a housing configured to accommodate the circuit board, the first connection terminal, and the second connection terminal, the housing including an engaging convex portion having a shape convex toward an outer surface of the housing, and an engaging concave portion having a shape concave toward an outer surface of the housing and being capable of engaging with the engaging convex portion.

According to this configuration, the engaging convex portion and the engaging concave portion each have a shape that can engage with each other, and therefore, by engaging the engaging convex portion and the engaging concave portion with each other between the electrical connection cassettes, the electrical connection cassettes can be mechanically connected to each other.

As an aspect of the disclosure, the engaging convex portion may include an accommodating concave portion recessed towards an inside from a surface on a side of an engaging direction, and one of the first connection terminal and the second connection terminal may be accommodated in the accommodating concave portion of the engaging convex portion, and the other of the first connection terminal and the second connection terminal may be accommodated inside the engaging concave portion.

According to this configuration, the space at which the engaging concave portion and the engaging convex portion are disposed can also serve as the space at which the first connection terminal and the second connection terminal are disposed, and the electrical connection cassette can be made more compact. Moreover, the first connection terminal and the second connection terminal can be connected to each other by simply engaging the engaging convex portion and the engaging concave portion with each other between the electrical connection cassettes.

As an aspect of the disclosure, the engaging convex portion may be shaped such that a cross-sectional shape thereof extends along an engaging direction of the engaging convex portion, the cross-sectional shape including a first widened portion and a first narrowed portion which connects the first widened portion and the outer surface of the housing and which has a width narrower than the width of the first widened portion, and the engaging concave portion may include on the outer surface of the housing an opening portion in an aperture shape capable of engaging with the cross-sectional shape, the aperture shape being formed in a shape which extends along an engaging direction of the engaging concave portion, the aperture shape including a second widened portion capable of engaging with the first widened portion, and a second narrowed portion by which the second widened portion and the outer surface of the housing communicate with each other and which has a width allowing the first narrowed portion to engage with.

According to this configuration, the engaging structure between the engaging convex portion and the engaging concave portion can be a slide engaging structure.

As an aspect of the disclosure, a functional circuit may be mounted on the circuit board, the functional circuit configuring one or more functions of a relay function for blocking or conducting an electrical path formed on the circuit board, a fuse function for blocking the electrical path when a time integral value of a current, for a given time, flowing through the electrical path formed on the circuit board is greater than or equal to a predetermined integral value, a voltage monitoring function for outputting a reset signal when a voltage of the electrical path formed on the circuit board is less than or equal to a predetermined voltage value, a recording function for recording a voltage value of the electrical path formed on the circuit board and/or a current value of a current flowing through the electrical path, a filter function for removing noise flowing through the electrical path formed on the circuit board, and a backup capacitor function for supplying power when power supply is shut down.

This configuration allows the electrical connection cassette to have various functions.

The disclosure includes: a circuit board; a first connection terminal and a second connection terminal disposed facing each other in an in-plane direction which is a direction parallel to a main surface of the circuit board and mounted on the circuit board; and a housing having a rectangular parallelepiped shape to accommodate and hold the circuit board, the housing including an engaging convex portion having a convex shape and an engaging concave portion having a concave shape which are formed facing each other in the in-place direction and formed in a concave and convex shape corresponding to each other, the first connection terminal and the second connection terminal being formed to have a corresponding shape capable of engaging with each other along a predetermined connection direction, and configured electrically conductive in a state in which the housing and another housing adjacent thereto in the in-place direction are concave-convex engaged along the predetermined connection direction.

The rectangular parallelepiped shape refers to a substantially hexagonal shape such as a cuboid and a cube.

According to this configuration, the electrical connection cassettes can be connected to another electrical connection cassette along the in-plane direction, and thus the device can be freely expanded and added with functions in accordance with the size of the free space.

As an aspect of the disclosure, with the first connection terminal and the second connection terminal constituting one set terminal, a first set terminal to which a predetermined power source is connected and a second set terminal connected to a ground may be provided.

Further, as an aspect of the disclosure, one connection terminal of the first connection terminal and the second connection terminal may be accommodated in the engaging convex portion of the housing, and the other connection terminal of the first connection terminal and the second connection terminal may be accommodated in the engaging concave portion of the housing.

As an aspect of the disclosure, a plurality of connection terminals, each of which is one of the first connection terminal and the second connection terminal, may be accommodated in the engaging convex portion of the housing, and the same number of connection terminals, each of which is the other of the first connection terminal and the second connection terminal, as the number of the plurality of connection terminals may be accommodated in the engaging concave portion of the housing.

As an aspect of the disclosure, the predetermined connection direction is a direction parallel to a main surface of the circuit board.

As an aspect of the disclosure, the predetermined connection direction is a direction perpendicular to a main surface of the circuit board.

As an aspect of the disclosure, the predetermined connection direction is a direction perpendicular to surfaces of the housing facing in the in-place direction.

As an aspect of the disclosure, the first connection terminal and the second connection terminal each are formed in a plate shape having a main surface orthogonal to each other, and the predetermined connection direction is a direction parallel to the main surface of the first connection terminal and the main surface of the second connection terminal.

As an aspect of the disclosure, the first connection terminal and the second connection terminal each are formed in a shape having a main surface orthogonal to each other, and the predetermined connection direction is a direction perpendicular to the main surface of the first connection terminal or the main surface of the second connection terminal.

As an aspect of the disclosure, the first connection terminal and the second connection terminal may be disposed on a virtual straight line along the in-place direction.

As an aspect of the disclosure, the first connection terminal and the second connection terminal may be disposed on only one main surface of the circuit board.

As an aspect of the disclosure, a functional circuit may be mounted on the circuit board, the functional circuit configuring one or more functions of a relay function for blocking or conducting an electrical path formed on the circuit board, a fuse function for blocking the electrical path when a time integral value of a current, for a given time, flowing through the electrical path formed on the circuit board is greater than or equal to a predetermined integral value, a voltage monitoring function for outputting a reset signal when a voltage of the electrical path formed on the circuit board is less than or equal to a predetermined voltage value, a recording function for recording a voltage value of the electrical path formed on the circuit board and/or a current value of a current flowing through the electrical path and other information, a recording function for recording information acquired by communication with a higher system, a filter function for removing noise flowing through the electrical path formed on the circuit board, and a backup capacitor function for supplying power when power supply is shut down.

Advantageous Effects of Invention

According to the disclosure, an electrical connection cassette can be provided that can freely expand the device and add functions in accordance with the size of a free space.

BRIEF DESCRIPTION OF DRAWINGS

FIGS. 4A and 4B are front views illustrating a circuit board on which various circuit components are mounted, viewed from the side of one main surface and viewed from the side of the other main surface, respectively.

DESCRIPTION OF EMBODIMENTS

Example 1

Referring now to FIGS. 1 to 11, an electrical connection cassette 1 according to an embodiment of the disclosure will be described.

Summary

Figure 1:
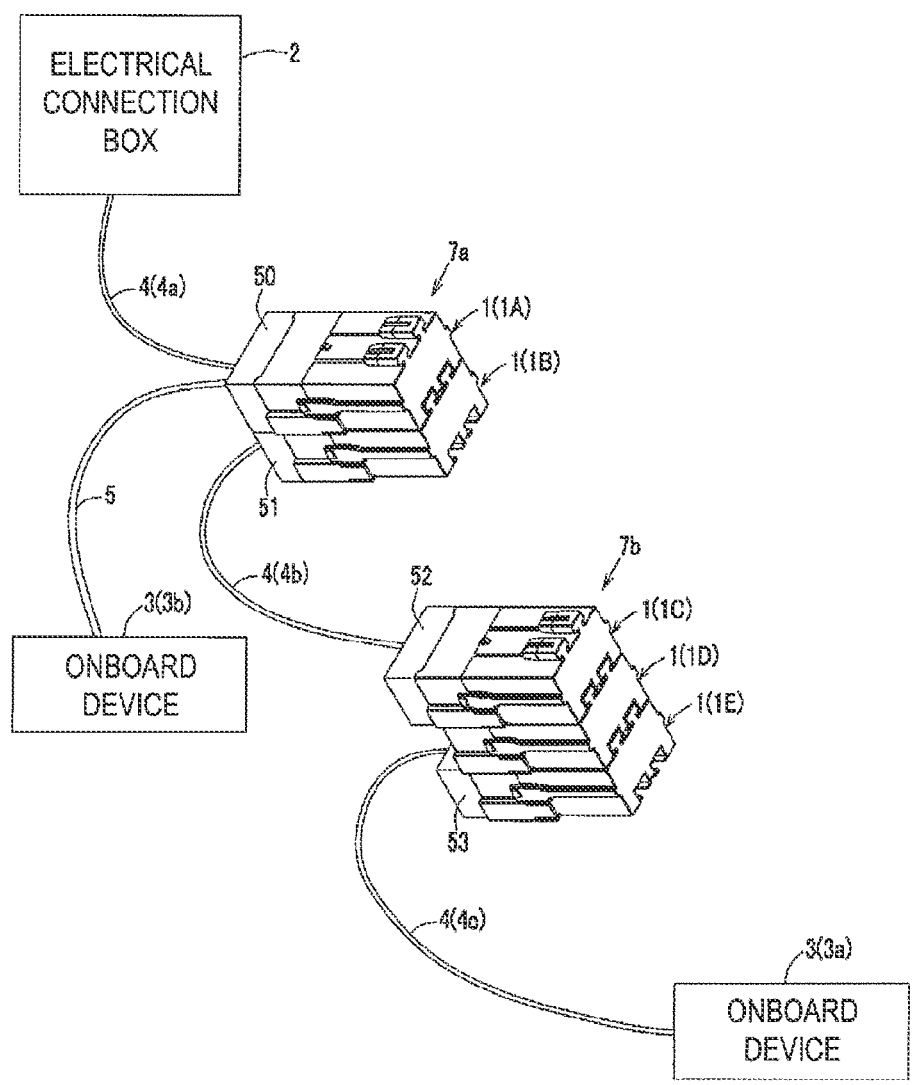
FIG. 1 is a diagram illustrating an example of use of an electrical connection cassette according to an embodiment of the disclosure.

As illustrated in FIG. 1, the electrical connection cassette 1 is a device that is interposed on the route of a power feeder line 4 that connects an electrical connection box 2 mounted on a vehicle (for example, an automobile) and an onboard device 3, and monitors the power supplied to the onboard device 3. Note that the electrical connection box 2 is a device that dispenses power from a power source (for example, a battery) to a plurality of onboard devices 3.

More particularly, the electrical connection cassette 1 is a device having a function from among various functions (e.g., fuse function, relay function, voltage monitoring function, filter function, backup capacitor function, etc.). One or more electrical connection cassettes 1 of similar type having the same or different functions can be combined and electrically connected to each other, such that one or more functions can be selectively used in combination, in accordance with the size of the free space within the vehicle, for example. Note that in this embodiment, each electrical connection cassette 1 is described as having one function, but each electrical connection cassette 1 may have multiple functions.

In FIG. 1, as an example, a cassette connection body 7a and a cassette connection body 7b, which connect one or more electrical connection cassettes 1 to each other, are interposed in the power feeder line 4.

The cassette connection body 7a is configured, for example, with two electrical connection cassettes 1A and 1B each having a fuse function connected to each other. An external connector 50 connected to a power feeder line 4a from the electrical connection box 2 is connected to the electrical connection cassette 1A, and an external connector 51 connected to a power feeder line 4b connected to the onboard device 3 is connected to the electrical connection cassette 1B.

The cassette connection body 7b is configured by an electrical connection cassette 1C having a fuse function, an electrical connection cassette 1D having a filter function, and an electrical connection cassette 1E having a backup capacitor function connected to each other. An external connector 52 connected to the power feeder line 4b from the electrical connection box 2 side is connected to the electrical connection cassette 1C, and an external connector 53 connected to a power feeder line 4c connected to the onboard device 3 is connected to the electrical connection cassette 1E.

In FIG. 1, the power supplied to the onboard device 3a is monitored by each function of electrical connection cassettes 1A to 1E interposed on the route of the power feeder line 4 connected to the onboard device 3.

Note that in FIG. 1, a power supply path 5 is connected to the external connector 50 by branch joint, and the power from the power feeder line 4a is also supplied to another onboard device 3b via the power supply path 5.

Note that each of electrical connection cassettes 1A to 1E monitors the power supplied to the onboard device 3 connected thereto downstream. Because the power supply path 5 is branched from the upstream side of each of electrical connection cassettes 1A to 1E, the other onboard device 3b is excluded from the subject of power monitoring by each of electrical connection cassettes 1A to 1E. Note that, if the power supply path 5 is connected to the external connector 52 by branch joint, the onboard device 3b is connected to the downstream side of each of electrical connection cassettes 1A and 1B, and thus the power supplied to the onboard device 3b is also monitored by each of electrical connection cassettes 1A and 1B.

Electrical Connection Cassette 1

Figure 2:
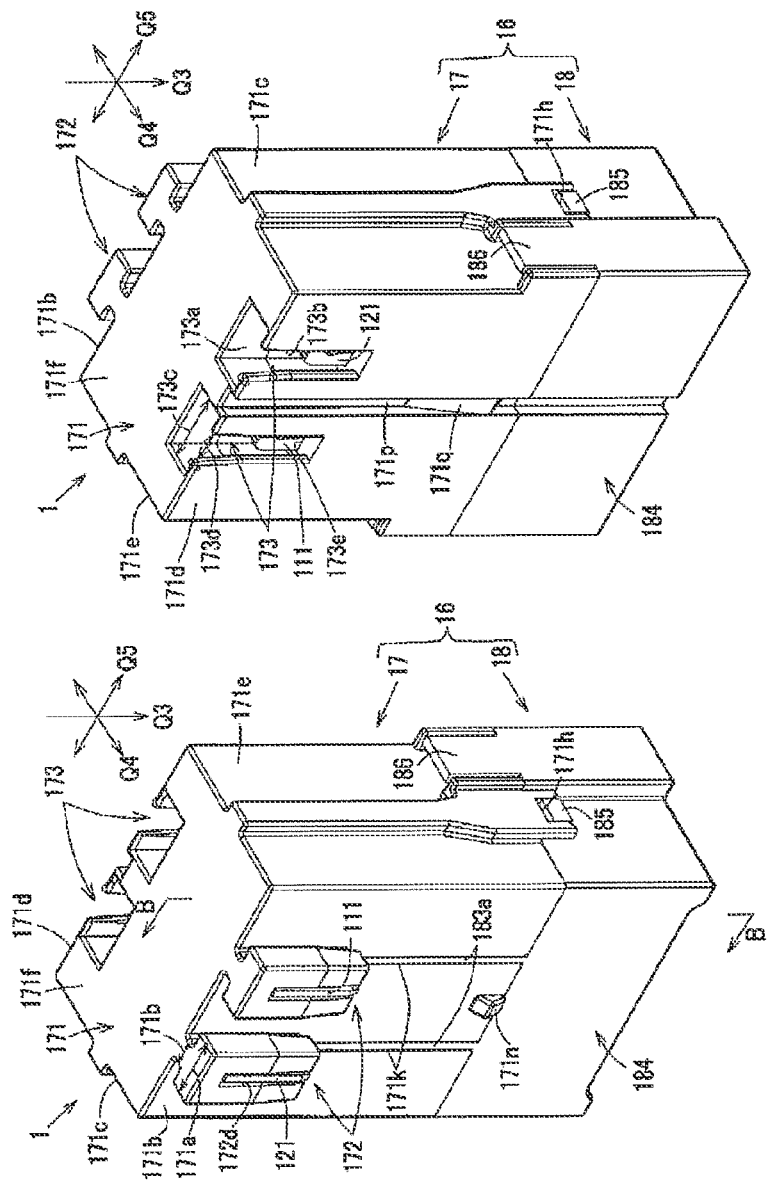
FIGS. 2A and 2B are, respectively, a perspective view of the electrical connection cassette viewed from the front side of the electrical connection cassette and a perspective view of the electrical connection cassette viewed from the back side of the electrical connection cassette.
Figure 3:
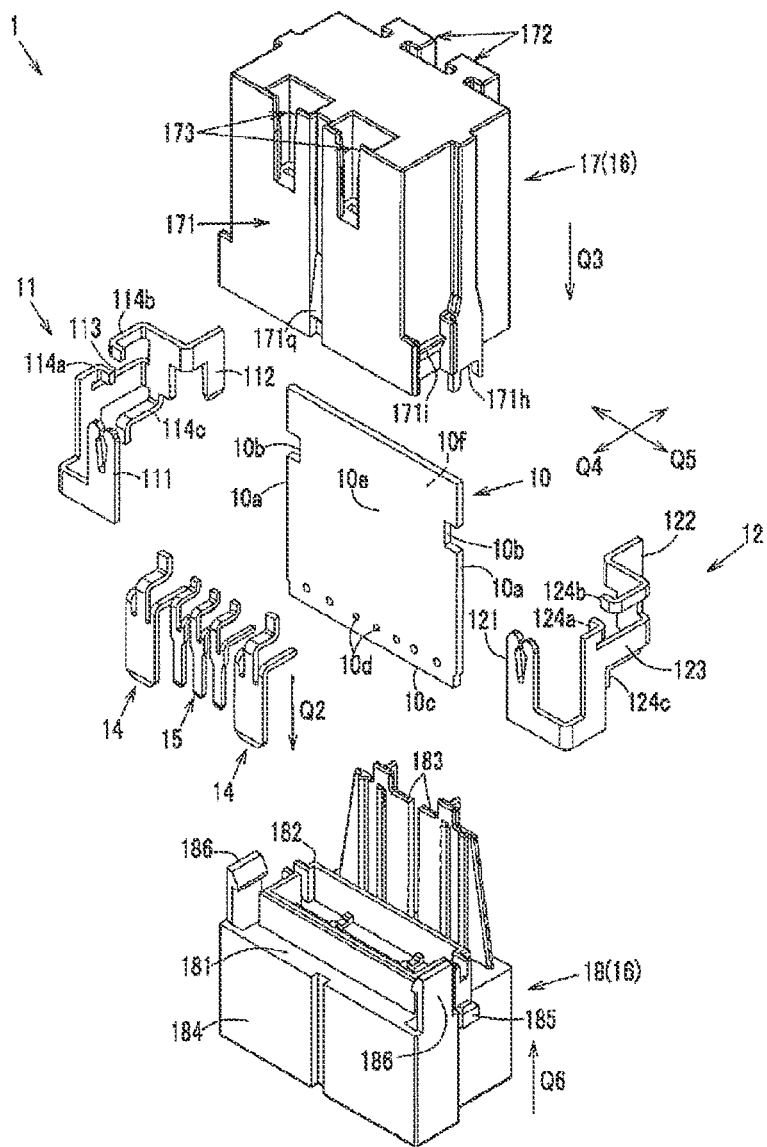
FIG. 3 is an exploded perspective view illustrating the electrical connection cassette.

As illustrated in FIGS. 2 and 3, the electrical connection cassette 1 includes a circuit board 10, a pair of metal members 11, 12 and a plurality of external connector terminals 14, 15 mounted on the circuit board, and a housing 16 configured to accommodate the circuit board 10.

Circuit Board 10

The circuit board 10 is, for example, formed into a rectangular plate shape as seen in plan view. Circuit components that constitute a function of various functions (e.g., fuse function, relay function, voltage monitoring function, recording function, filter function, backup capacitor function, and the like) are mounted on a main surface of the circuit board 10 on which an electrical path constituting a circuit is formed.

Note that the above-described relay function includes a semiconductor switch that blocks or conducts the electrical path formed on the circuit board 10 (that is, an electrical path through which electrical power flows), and a control unit that controls the semiconductor switch in response to an external control signal, and is a function of blocking or conducting the electrical path described above in response to an external control signal.

The fuse function described above includes a semiconductor switch that blocks or conducts the electrical path formed on the circuit board 10 (that is, an electrical path through which electrical power flows), a current sensor that detects a current flowing in the electrical path, and a control unit that controls the semiconductor switch on the basis of a detection result of the current sensor, and is a function of blocking the electrical path described above when a time integral value (e.g., Joule heat integral value) of the current flowing in the electrical path for a given time is equal to or greater than a predetermined integrated value.

The voltage monitoring function described above includes a voltage sensor that detects a voltage of the electrical path (that is, an electrical path through which electrical power flows) formed on the circuit board 10, and a control unit that outputs a predetermined signal (for example, a reset signal) on the basis of a detection result of the voltage sensor, and is a function for outputting the predetermined signal when the voltage of the electrical path described above is equal to or less than a predetermined voltage value.

The recording function described above is a function of recording the voltage value of the electrical path formed on the circuit board 10 and/or the current value of the current flowing in the electrical path. The recording function includes a non-volatile memory, and the voltage value and current value described above may be recorded in the non-volatile memory, or signals may be sent to and received at a higher system located outside the electrical connection cassette 1, and the voltage value and current value described above may be recorded in the higher system. Alternatively, the recording function may record acquisition information acquired by communication with the higher system.

The filter function described above includes a coil or a rectifying element provided in the electrical path formed in the circuit board (that is, an electrical path through which electrical power flows), and is a function of removing noise flowing in the electrical path described above.

The backup capacitor function described above includes a capacitor and the like for the power source backup, is a function of performing backup of the power source by discharging the power charged to the capacitor when the power source is shut down.

Cutout portions 10b to which the metal members 11, 12 engage are provided on side portions 10a on both sides of the circuit board 10 in the board width direction Q5. Note that the board width direction Q5 is a width direction being a direction orthogonal to the engaging direction Q1 of the circuit board 10. The engaging direction Q1 is a direction in which the circuit board 10 relatively approaches to (i.e., engages with) an upper case 17 when the circuit board 10 is accommodated in the upper case 17 described below of the housing 16.

Each of the cutout portions 10b is formed in a concave shape with a rectangular shape in a side view, for example, having a depth deeper than the thickness of the metal member 11, 12. Each of the cutout portions 10b is formed at the same position with respect to the engaging direction Q1.

A plurality of hole portions 10d into which leg portions 142, 152 of a plurality of external connector terminals 14, 15 are inserted are provided on the edge of a base end portion 10c on the side opposite the engaging direction Q1 of the circuit board 10. The plurality of hole portions 10d are aligned in a row along the base end portion 10c. In other words, the plurality of hole portions 10d are provided at the same position with respect to a direction parallel to the connector connection direction Q2 of the plurality of external connector terminals 14, 15.

Note that the connector connection direction Q2 is a direction in which the external connector terminals 14, 15 are relatively close to the mating connector terminals when the external connector terminals 14, 15 are connected to the mating connector terminals, and in this embodiment, is opposite to the engaging direction Q1. A direction parallel to the connector connection direction Q2 includes the connector connection direction Q2 and the opposite direction thereto.

Metal Members 11, 12

Each of metal members 11, 12 is a terminal for electrically connecting to each other in the same type electrical connection cassettes 1. Because each of metal members 11, 12 is formed in mirror image symmetry with each other, the structure of the metal member 11 will be mainly described below.

As illustrated in FIGS. 4 to 7, the metal member 11 includes a first connection terminal 111 and a second connection terminal 112 each having a terminal shape that can engage with each other, a connecting portion 113 that connects the first connection terminal 111 and the second connection terminal 112, and a plurality (for example, three) of clamping portions 114 (114a, 114b, 114c) that sandwich the circuit board 10 from the both sides of the main surfaces 10e, 10f to fix the metal member 11 to the circuit board 10.

The first connection terminal 111 is disposed on the side of the one main surface 10e of the circuit board 10 with the terminal connection direction Q8 thereof oriented in the engaging direction Q1 (a predetermined direction with respect to the circuit board 10), and the second connection terminal 112 is disposed on the side of the other main surface 10f of the circuit board 10 with the terminal connection direction Q9 thereof oriented in a direction parallel to the terminal connection direction Q8 (for example, opposite to the terminal connection direction Q8).

Note that the terminal connection direction Q8 of the first connection terminal 111 is a direction in which the first connection terminal 111 is relatively closer to the mating connection terminal when the first connection terminal 111 connects with the mating connection terminal. The terminal connection direction Q9 of the second connection terminal 112 is the same as the terminal connection direction Q8 of the first connection terminal 111.

The terminal connection direction Q8 of the first connection terminal 111 may be opposite to the engaging direction Q1. The terminal connection direction Q9 of the second connection terminal 112 may be the same direction as the terminal connection direction Q8 of the first connection terminal 111.

In the above-described arrangement of the first connection terminal 111 and the second connection terminal 112, the position P1 of the first connection terminal 111 with respect to the circuit board 10 and the position P2 of the second connection terminal 112 with respect to the circuit board 10 coincide in a front view with respect to a main surface of the circuit board 10.

Note that the above-described "position P1 of the first connection terminal 111" refers to, for example, the position of the connecting portion of the first connection terminal 111 with the mating connection terminal (more specifically, a predetermined position within the connection portion (for example, the central position)). The above-described "position P2 of the second connection terminal 112" is also the same as the "position P1 of the first connection terminal 111" described above.

The connection portion of the first connection terminal 111 is formed in a tuning-fork shaped terminal (or fork shape), and a main surface of the connection portion of the first connection terminal 111 is disposed parallel to one main surface 10e of the circuit board 10. The connection portion of the second connection terminal 112 is formed into a tab shaped terminal (or plate shape) that can engage with the above-described tuning-fork shape terminal, and a main surface of the connection portion of the second connection terminal 112 is disposed perpendicular to the other main surface 10f of the circuit board 10.

Note that the connection portion of the first connection terminal 111 may be formed in a tab shaped terminal, and the connection portion of the second connection terminal 112 may be formed in a tuning-fork shaped terminal, or the connection portion of the first connection terminal 111 and the connection portion of the second connection terminal 112 may be both formed in tuning-fork shaped terminals that can engage with each other. A main surface of the connection portion of the first connection terminal 111 may be disposed perpendicular to the one main surface 10e of the circuit board 10, and a main surface of the connection portion of the second connection terminal 112 may be disposed parallel to the other main surface 10f of the circuit board 10.

The connecting portion 113 is mounted to the circuit board 10 and connects and supports the first connection terminal and the second connection terminal so that the first connection terminal 111 and the second connection terminal 112 are arranged as described above with respect to the circuit board 10.

Specifically, one end of the connecting portion 113 is disposed above the one main surface 10e of the circuit board 10 and is connected to the first connection terminal 111, and the other end thereof is disposed above the other main surface 10f of the circuit board 10 and is connected to the second connection terminal 112. The connecting portion 113 is formed by bending in a substantially U-shaped manner, i.e., bent from above the one main surface 10e of the circuit board 10 to the edge side of the circuit board 10 to extend above the other main surface 10f of the circuit board 10.

Figure 7:
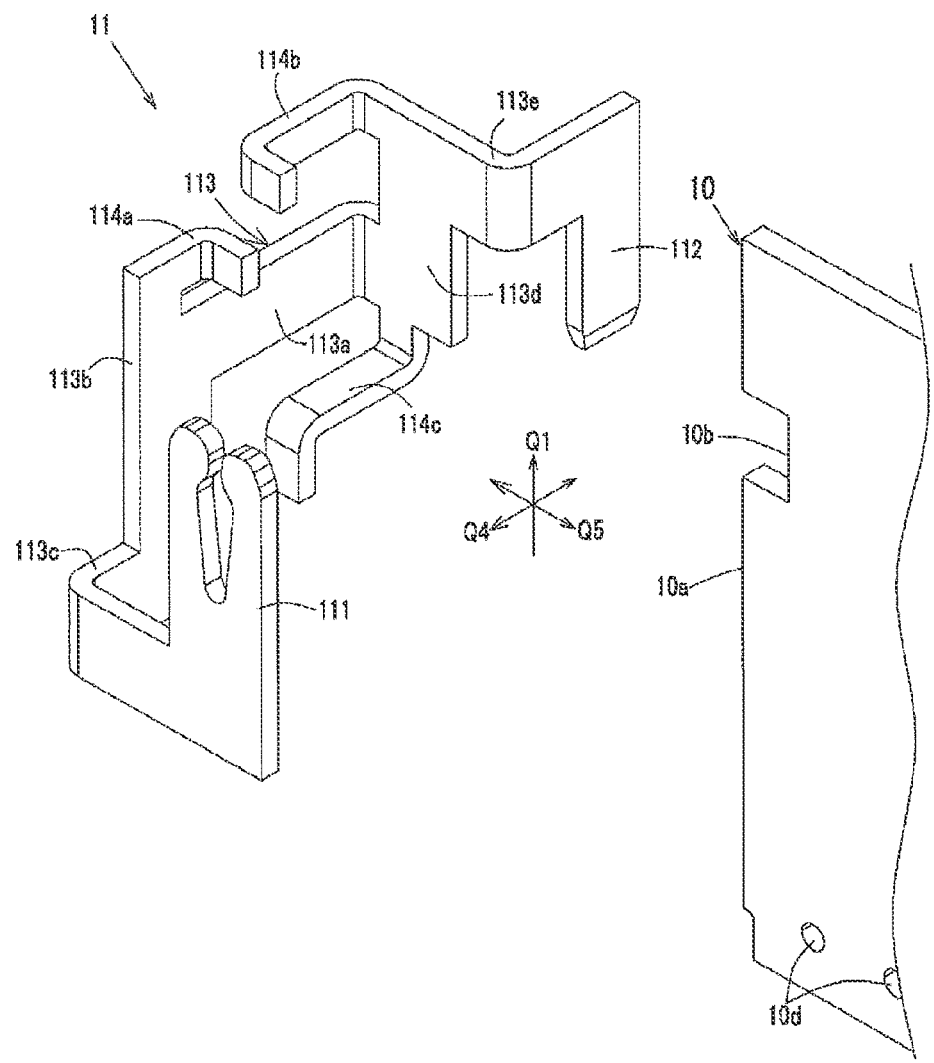
FIG. 7 is an enlarged perspective view illustrating a metal member of FIG. 3.

More particularly, as illustrated in FIG. 7, the connecting portion 113 includes a first connecting portion 113a extending in the direction Q4 orthogonal to the main surfaces 10e, 10f of the circuit board 10 (hereinafter referred to as the board orthogonal direction), a second connecting portion 113b extending from an end portion of the first connecting portion 113a on the one main surface 10e side to an opposite side in the engaging direction Q1, a third connecting portion 113c that extends from an end portion on the side opposite the engaging direction Q1 of the second connecting portion 113b toward the one main surface 10e side in the board orthogonal direction Q4, the third connecting portion 113c being bent inward in the board width direction Q5 in the extending portion. The first connection terminal 111 is connected to an end portion on the inner side in the board width direction Q5 of the third connecting portion 113c.

The connecting portion 113 includes a fourth connecting portion 113d extending in the engaging direction Q1 from an end portion on the other main surface 10f side of the first connecting portion 113a projected to the inner side in the board width direction Q5, a fifth connecting portion 113e extending from an end portion of the fourth connecting portion 113d in the engaging direction Q1 side to the inside in the board width direction Q5, and bent toward the other main surface 10f side in the board orthogonal direction Q4 in the extending portion. The second connection terminal 112 is connected to an end portion of the fifth connecting portion 113e on the other main surface 10f side in the board orthogonal direction Q4.

As illustrated in FIG. 7, some clamping portions (for example, 114a) of the plurality of clamping portions 114 are extended toward the one main surface 10e from a portion of the connecting portion 113 protruding toward the one main surface 10e of the circuit board 10 (for example, the end portion of the second connecting portion 113b on the engaging direction Q1 side). The tip portion of the clamping portion 114a is bent in a direction parallel to the one main surface 10e and is abutted against the one main surface 10e.

Remaining clamping portions (for example, 114b, 114c) of the plurality of clamping portions 114 are extended from a portion of the connecting portion 113 that protrudes toward the other main surface 10f of the circuit board 10 (for example, the outer side portion of the fourth connecting portion 113d in the board width direction Q5 and an end portion of the fourth connecting portion 113d on the side opposite of the engaging direction Q1) toward the other main surface 10f. The tip portion of each of the clamping portions 114b, 114c is bent in a direction parallel to the other main surface 10f and is abutted against the other main surface 10f.

The metal member 11 is mounted on the circuit board 10 by the first connecting portion 113a of the connecting portion 113 engaged with the cutout portion 10b of the circuit board 10, and the circuit board 10 sandwiched between the tip portion of the clamping portion 114a and the tip portion of each of the clamping portions 114b, 114c.

As described above, by the connecting portion 113 engaged with the cutout portion 10b, the position of the metal member 11 in the direction along the engaging direction Q1 with respect to the circuit board 10 is positioned. In this engaged state, the outer side surface 113s of the first connecting portion 113a is disposed farther to the back side than the side portion 10a of the circuit board 10 (FIG. 4A).

As described above, by the circuit board 10 being sandwiched between the tip end portion of the clamping portion 114a and the tip portion of each of the clamping portions 114b, 114c, the position of the metal member 11 in the board orthogonal direction Q4 with respect to the circuit board 10 is determined.

Figure 6A:
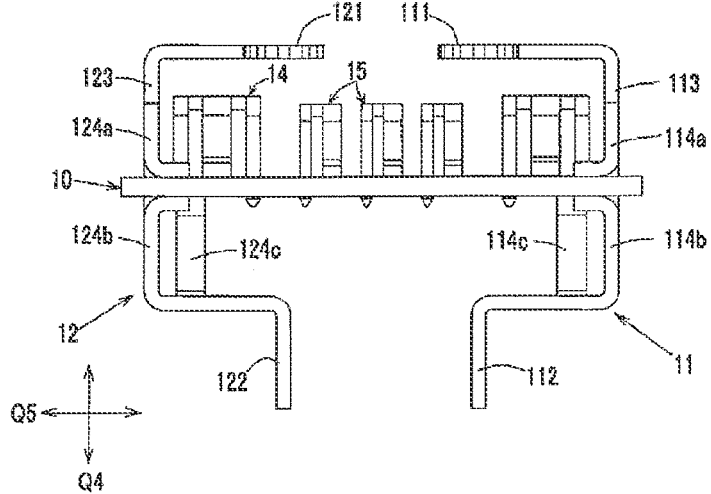
FIG. 6A is a view of the circuit board of FIG. 4B viewed from the side in an engaging direction Q1.
Figure 6B:
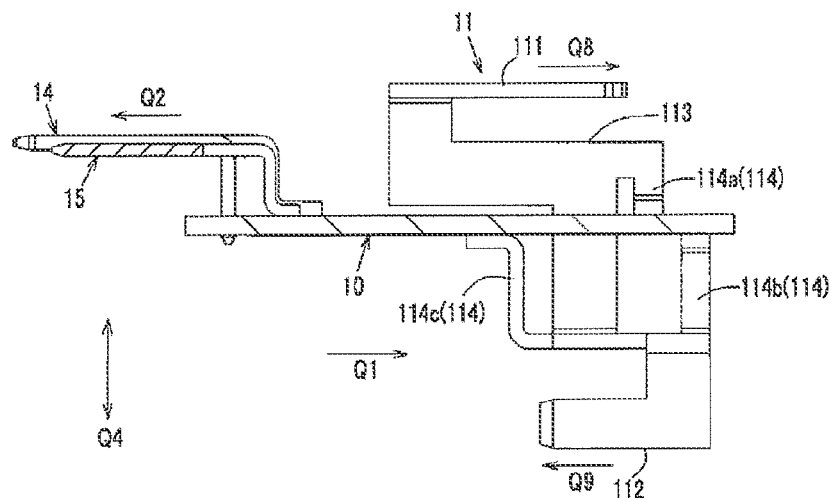
FIG. 6B is a cross-sectional view taken along A-A of FIG. 4A.

In this embodiment, as illustrated in FIG. 6B, the tip end portion of each clamping portion 114b, 114c is disposed offset on both sides in the direction along the engaging direction Q1 of the tip portion of the clamping portion 114a. As a result, the circuit board 10 is held in a well-balanced manner by the tip portion of each of the clamping portions 114a, 114b, 114c.

In this embodiment, each of clamping portions 114a, 114b, 114c serves as a mechanical connection portion that mechanically connects with the circuit board 10. At least one clamping portion of the clamping portions 114a, 114b, 114c (for example, the clamping portion 114c) is electrically connected to an electrical path provided on the circuit board 10, and also functions as an electrical connection portion that is electrically connected to the electrical path formed on the circuit board 10. In this way, the metal member 11 is electrically connected to the electrical path formed on the circuit board 10 via the electrical connection portion described above, and thus the heat generated from the circuit components mounted on the circuit board 10 is dissipated from the metal member 11 through the electrical path. In other words, the metal member 11 also functions as a heat dissipating portion.

Note that, as illustrated in FIGS. 3 to 6, the metal member 12, similar to the metal member 11, includes a first connection terminal 121 and a second connection terminal 122 having a terminal shape that can engage with each other, a connecting portion 123 that connects the first connection terminal 121 and the second connection terminal 122, and a plurality (for example, three) of clamping portions 124 (124a, 124b, 124c) that secure the metal member 12 to the circuit board 10 by sandwiching the circuit board 10 from both sides of the main surface 10e, 10f sides, and also functions as a heat dissipating portion. The metal member 12 is formed with mirror image symmetry with the metal member 11, and is mounted to the circuit board 10 in the same manner as the metal member 11.

Figures 5A, 5B:
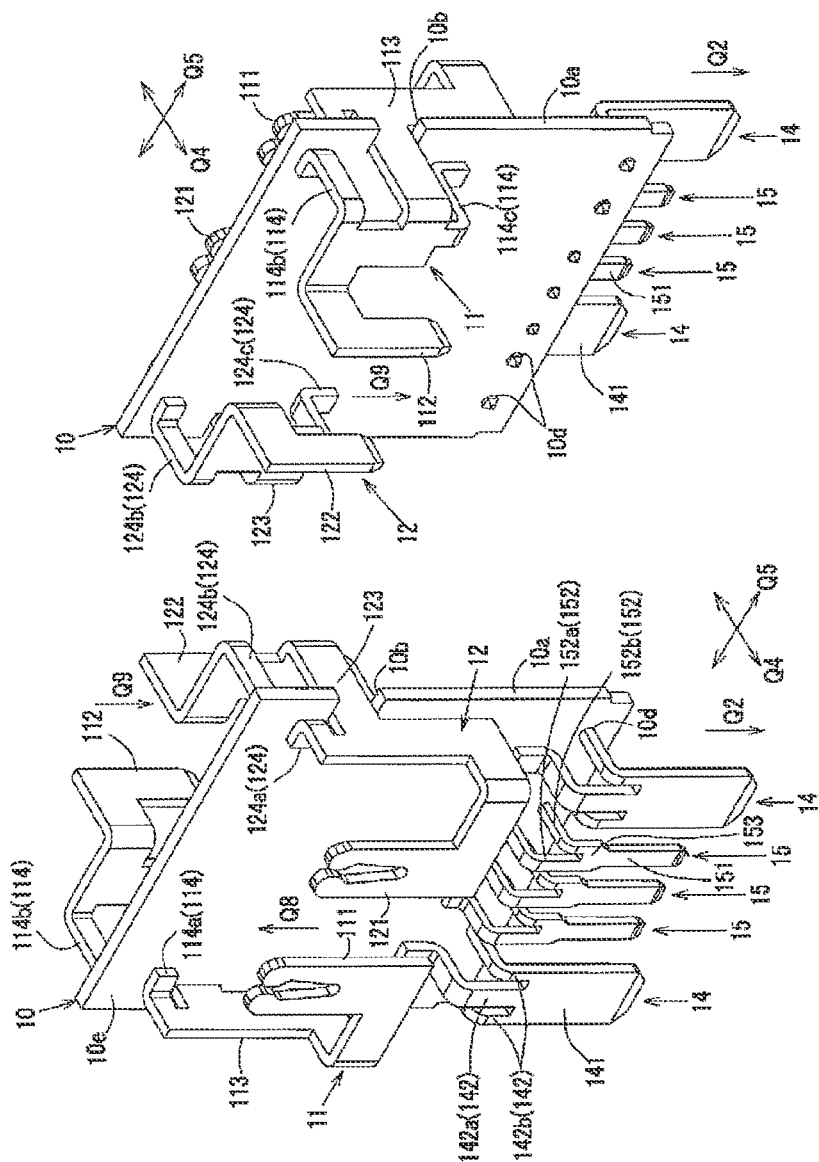
FIGS. 5A and 5B are perspective views of the circuit board on which various circuit components are mounted, viewed from the side of one main surface and viewed from the side of the other main surface, respectively.

With each of metal members 11, 12 mounted on the circuit board 10, as illustrated in FIG. 4A and FIG. 5A, on the one main surface 10e side of the circuit board 10, the first connection terminals 111, 121 of each metal member 11, 12 are disposed at intervals in the board width direction Q5 with the terminal connection directions Q8 oriented in the engaging direction Q1. As illustrated in FIG. 4B and FIG. 5B, on the other main surface 10f side of the circuit board 10, the second connection terminals 112, 122 of each metal member 11, 12 are disposed at intervals in the board width direction Q5 with the terminal connection directions Q9 oriented in the opposite direction to the engaging direction Q1.

External Connector Terminals 14, 15

Each external connector terminal 14, 15 is a connector terminal to which a mating connector terminal for external power or signal is connected. As illustrated in FIG. 4A and FIG. 5A, each external connector terminal 14, 15 is mounted on an edge of the one main surface 10e of the circuit board 10 opposite the engaging direction Q1 in a state in which the connector connection direction Q2 is disposed parallel to the circuit board 10 (e.g., in a state oriented in the opposite direction to the engaging direction Q1).

Note that "parallel" described above is not limited to a parallel direction in a strict sense, but also includes a direction offset within a certain range around the parallel direction (for example, a direction that appears to be approximately parallel) (the same as below). The connector connection direction Q2 is a direction in which the external connector terminals 14, 15 relatively approach the mating connector terminals when the external connector terminals 14, 15 connect with the mating connector terminals.

The external connector terminal 14 is, for example, a three-piece connector terminal including three leg portions, is connected to a mating connector terminal from the outside, and is input with a relatively large current (power in this embodiment). The external connector terminal 14 is electrically connected to the metal member 11 via the electrical path formed on the circuit board 10. Hereinafter, this is also referred to as a three-piece connector terminal 14.

The external connector terminal 15 is, for example, a two-piece connector terminal including two leg portions, and connected to a mating connector terminal from the outside, and input with a relatively small current (such as a control signal in this embodiment). The external connector terminal 15 is electrically connected to circuit components (for example, control terminals of semiconductor switches or input/output terminals of 1C) having various functions mounted on the circuit board 10 via the electrical path formed on the circuit board 10. Hereinafter, this is also referred to as a two-piece connector terminal 15.

In this embodiment, two of three-piece connector terminals 14 are provided, and three of two-piece connector terminals 15 are provided, but a greater number of three-piece connector terminals 14 may be provided, for example, and one or more of two-piece connector terminals 15 may be provided. In a case where three-piece connector terminals 14 and two-piece connector terminals 15 are not necessary, the terminals 14 and the terminals 15 need not be provided.

The three-piece connector terminal 14 is provided with a relatively wide, for example, rectangular, flat plate-shaped terminal main body 141, and three leg portions 142 provided at the base end of the terminal main body 141 and arranged in the lateral width direction (that is, the board width direction Q5) of the terminal main body 141. Note that the base end of the terminal main body 141 is an end portion of the terminal main body 141 opposite the connector connection direction Q2.

The terminal main body 141 is disposed on the one main surface 10e side of the circuit board 10 in a state in which the connector connection direction Q2 is disposed parallel to the circuit board 10 (for example, in a state oriented in the opposite direction to the engaging direction Q1).

The three leg portions 142 are constituted by one surface connection leg portion 142a and two insertion leg portions 142b. In this embodiment, the surface connection leg 142a is disposed between the two insertion leg portions 142b, but may be disposed on one side of the both side of the two insertion leg portions 142b.

The surface connection leg portion 142a extends from the terminal main body 141 and is bent toward the side of the circuit board 10, with the tip portion thereof bent in a direction parallel to the one main surface 10e of the circuit board 10, and the tip portion thereof connected to the one main surface 10e of the circuit board 10. Each insertion leg portion 142b is extended from the terminal main body 141 and is bent to the side of the circuit board 10 and inserted into and connected with a hole portion 10d of the circuit board 10. Each leg portion 142 (142a, 142b) is, for example, bent parallel to the width direction of each leg portion 142 (i.e., the width direction of the terminal main body 141).

The connection position of the three leg portions 142 with the circuit board 10 in at least one leg portion is shifted in a direction parallel to the connector connection direction Q2 (for example, on the opposite side to the connector connection direction Q2) with respect to the connection position with the circuit board 10 in the other leg portions. In this embodiment, of the three leg portions 142, the connection positions P3 of the leg portions on both sides (for example, each insertion leg portion 142b) are aligned in a row along a direction orthogonal to the connector connection direction Q2 (that is, the board width direction Q5), while being offset farther in the connector connection direction Q2 than the connection position P4 of the middle leg (for example, the surface connection leg portion 142a).

Note that the "direction parallel to the connector connection direction Q2" includes the connector connection direction Q2 and the opposite direction.

The above described "offset in a direction parallel to the connector connection direction Q2" means that it may be offset in the direction orthogonal to the connector connection direction Q2 (that is, the board width direction Q5) if the offset is made in a direction parallel to the connector connection direction Q2.

The two-piece connector terminal 15 is provided with a relatively narrow, for example, rectangular, flat plate-shaped terminal main body 151, a widened portion 153 provided on the base end of the terminal main body 151 and being wider than the terminal main body 151, and two leg portions 152 provided on the widened portion 153 and arranged in the lateral width direction of the widened portion 153 (that is, the board width direction Q5). Note that the base end of the terminal main body 151 is an end portion of the terminal main body 151 opposite the connector connection direction Q2.

The terminal main body 151 is disposed on the one main surface 10e side of the circuit board 10 in a state in which the connector connection direction Q2 is arranged parallel to the circuit board 10 (for example, in a state oriented in the opposite direction to the engaging direction Q1).

The two leg portions 152 are constituted by one surface connection leg portion 152a and one insertion leg portion 152b.

The surface connection leg portion 152a is extended from the widened portion 153 and bent toward the side of the circuit board 10, with the tip portion thereof bent in a direction parallel to the one main surface 10e of the circuit board 10, and the tip portion thereof connected to the one main surface 10e of the circuit board 10. The insertion leg portion 152b is extended from the widened portion 153, bent toward the side of the circuit board 10, and inserted into and connected with a hole portion 10d of the circuit board 10. Each leg portion 152 (152a, 152b) is, for example, bent parallel to the width direction of each leg portion 152 (i.e., the width direction of the terminal main body 151).

Of the two leg portions 152, the connection position with the circuit board 10 in at least one leg portion is shifted in a direction parallel to the connector connection direction Q2 (for example, the opposite side of the connector connection direction Q2) with respect to the connection position with the circuit board 10 in the other leg portions. In this embodiment, the connection position P5 of the insertion leg portion 152b is offset farther in the connector connection direction Q2 than the connection position P6 of the surface connection leg portion 152a.

Note that in this embodiment, the surface connection leg portions 142a, 152a each are used as an electrical connection leg portion that electrically connects to the electrical path formed on the circuit board 10, and is electrically connected to the electrical path formed on the one main surface 10e of the circuit board 10, for example, by solder. The insertion leg portions 142b, 152b each are used as a mechanical connection leg portion that mechanically connects to the circuit board 10, and is connected by being pressed into the hole portion 10d of the circuit board 10. Note that "mechanically connect" as described above refers to only mechanically connecting without being electrically connecting. Noted that by the leg portion 142 (152) divided into the surface connection leg portion 142a (152a) as an electrical connection leg portion and the insertion leg portion 142b (152b) as a mechanical connection leg portion, the design is possible without considering the perspective of the mechanical connection for the electrical connection, and the degree of freedom and ease of design can be improved.

The insertion leg portion 142b of the three-piece connector terminal 14 is formed narrower than the surface connection leg portion 142a of the three-piece connector terminal 14, and the insertion leg portion 152b of the two-piece connector terminal 15 is formed narrower than the surface connection leg portion 152a of the two-piece connector terminal 15, for example.

The insertion leg portions 142b, 152b of the external connector terminals 14, 15 are arranged in a row along a direction orthogonal to the connector connection direction Q2. The surface connection leg portions 142a, 152a of the external connector terminals 14, 15 are arranged in a row along a direction orthogonal to the connector connection direction Q2.

In this embodiment, as an example, three of two-piece connector terminals 15 are arranged in the center of the edge of the base end 10c on the opposite side of the circuit board 10 in the engaging direction Q1, and two of three-piece connector terminals 14 are disposed on both sides of the two-piece connector terminals 14.

Housing 16

As illustrated in FIGS. 2 and 3, the housing 16 includes an upper case 17 that accommodates the circuit board 10, and a lower case 18 that closes an accommodation opening of the upper case 17.

Figure 8:
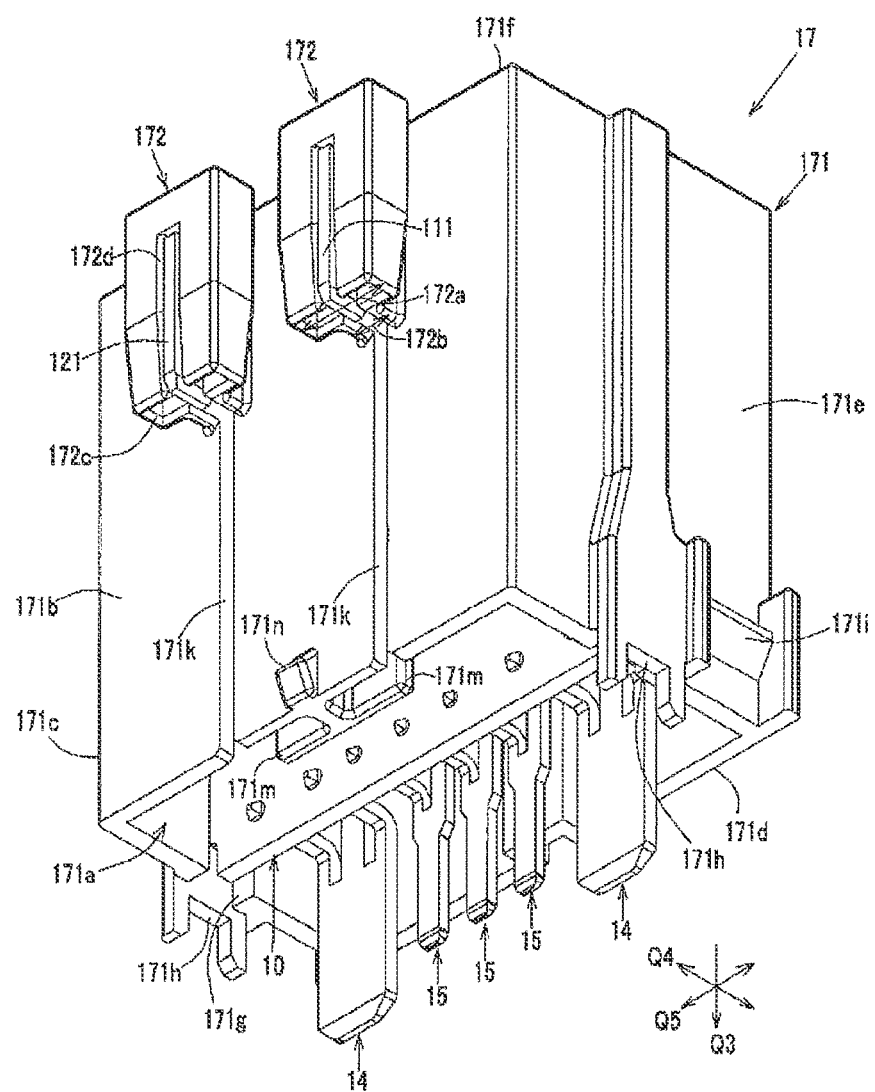
FIG. 8 is a perspective view illustrating an upper case in which the circuit board is accommodated.

As illustrated in FIG. 8, the upper case 17 includes a case main body 171 formed in a box shape, for example, a substantially rectangular parallelepiped shape having an open surface 171a. The open surface 171a configures the accommodation opening described above and communicates with an accommodation space inside the case main body 171. The case main body 171 includes four side wall portions 171b, 171c, 171d, 171e surrounding the periphery of the open surface 171a, and a bottom wall portion 171f disposed on an opposite side to the open surface 171a.

Guide rails 171g that engage with the side portion 10a on both side of the board width direction Q5 of the circuit board 10 are provided on the inner surfaces of the side wall portions 171c, 171e on both sides of the case main body 171 in the board width direction Q5. The guide rail 171g is extended along the engaging direction Q3, with one end portion opening at the open surface 171a and the other end portion reaching the bottom wall portion 171f. Note that the engaging direction Q3 is a direction in which the upper case 17 is relatively close to the lower case 18 when the upper case 17 and the lower case 18 are engaging with each other.

A pair of slits 171k, through which the connecting portions 113, 123 of each of the metal members 11, 12 mounted on the circuit board 10 pass, are provided on a side wall portion 171b on one side of the case main body 171 in the board orthogonal direction Q4. The pair of slits 171k are provided at positions offset from the center of the side wall portion 171b in the board width direction Q5 to both sides, and extend along the engaging direction Q3, with one end thereof opening at the open surface 171a and the other end thereof reaching the bottom wall portion 171f.

A pair of engaging convex portions 172 for mechanically connecting with another electrical connection cassette 1 are formed on an outer surface of the side wall portion 171b of the case main body 171 so as to be in a convex shape with respect to the outer surface of the side wall portion 171b. Each engaging convex portion 172 is provided overlapping the other end side (back side) of each slit 171k formed on the outer surface of the side wall portion 171b.

Each engaging convex portion 172 has a substantially T-shaped cross-sectional shape (that is, a cross-sectional shape having a widened portion 172a (first widened portion) and a narrowed portion 172b (first narrowed portion) that connects the widened portion 172a and the outer surface of the side wall portion 171b and is narrower than the widened portion 172a. The cross-sectional shape is formed in a shape extending along a direction parallel to the engaging direction Q3, for example, from the center of the engaging direction Q3 of the side wall portion 171b to the end portion on the bottom wall portion 171f side. Note that a direction parallel to the engaging direction Q3 includes the engaging direction Q3 and the opposite direction.

Each engaging convex portion 172 includes an accommodating concave portion 172c recessed inwardly from a tip surface on a side of the engaging direction Q3. The bottom surface shape of the accommodating concave portion 172c is formed in a substantially T-shape in accordance with the cross-sectional shape described above of the engaging convex portion 172. The accommodating concave portion 172c communicates with the slit 171k on the side wall portion 171b side, and a slit 172d is provided on the wall portion on the opposite side to the side wall portion 171b, where the outer side portion in the board orthogonal direction Q4 of the second connection terminal 112 is inserted.

A pair of engaging concave portions 173 for mechanically connecting with other electrical connection cassettes 1 are formed on the outer surface of the bottom wall portion 171*f* of the case main body 171 in a manner of concave toward the outer surface of the bottom wall portion 171*f*. Each engaging concave portion 173 is disposed at a position offset from the center to the both sides in the board width direction Q5 at the edge portion on the side wall portion 171*b* side of the outer surface of the bottom wall portion 171*f*.

Each engaging concave portion 173 is formed in a shape capable of engaging with the engaging convex portion 172. More specifically, each engaging concave portion 173 includes an engaging space which has an opening portion 173*a* on the outer surface of the bottom wall portion 171*f* and in which the widened portion 172*a* of the engaging convex portion 172 engages, and a slit 173*b* which communicates with the engaging space described above and the outer face of the side wall portion 171*d*, extends along the engaging direction Q3 at the side wall portion 171*d*, and in which the narrowed portion 172*b* of the engaging convex portion 172 engages.

In other words, each engaging concave portion 173 has the opening portion 173*a* on the outer surface of the bottom wall portion 171*f* with an aperture shape capable of engaging with the cross-sectional shape of the engaging convex portion 172, and the aperture shape is formed in a shape extending along the engaging direction Q3. The aperture shape of the engaging concave portion 173 includes a widened portion 173*c* (second widened portion) with which the widened portion 172*a* of the engaging convex portion 172 is capable of engaging, and a narrowed portion 173*d* (second narrowed portion) having a width in which the widened portion 173*c* and the outer surface of the side wall portion 171*d* communicate with each other and the narrowed portion 172*b* of the engaging convex portion 172 is capable of engaging.

An opening portion 173*e* through which each of the first connection terminals 111, 121 is inserted is provided on a back surface of each engaging concave portion 173 through the internal space of the case main body 171.

A pair of guide concave portions 171 *m* in which an inner side portion of each of a pair of protruding tabs 183 described below of the lower case 18 is inserted are provided in a state protruding from the inner surface of the side wall portion 171*b*, on the inner surface of the side wall portion 171*b* of the case main body 171. The pair of guide concave portions 171 *m* are disposed between the pair of slits 171*k*, are each oriented outward in the board width direction Q5, and are formed in mirror image symmetrical shapes with respect to each other. Each of the pair of guide concave portions 171 *m* has a substantially L-shaped cross-sectional shape, and the cross-sectional shape is formed in a shape extending along a direction parallel to the engaging direction Q3, for example, from one end to the other end of the side wall portion 171*b* in the engaging direction Q3, and forms a substantially U-shaped concave portion between the guide concave portion 171 *m* and the side wall portion 171*b*. In this embodiment, the pair of guide concave portions 171 *m* are integrally formed in a back-to-back manner.

A positioning concave portion 171 *h* that engages with a pair of positioning protrusion portions 185 described below of the lower case 18 is provided on the outer surfaces of the side wall portions 171*c*, 171*e* on both sides in the board width direction Q5 of the case main body 171. Each positioning concave portion 171 *h* is provided protruding from the open surface 171*a* in the engaging direction Q3. For example, a protruding locked portion 171*i* for locking a pair of locking portions 186, for example, in a locking claw shape described below of the lower case 18, is provided on the outer surfaces of the side wall portions 171*c*, 171*e* on both sides of the case main body 171.

The outer surface of the side wall portion 171*b* on one side in the board orthogonal direction Q4 of the case main body 171 is provided with, for example, a protruding locking portion 171*n* for locking connection with another electrical connection cassette 1 in the center of the edge portion of the open surface 171*a* side. A concave groove portion 171*p* is provided on the outer surface of the side wall portion 171*d* on the other side in the board orthogonal direction Q4 of the case main body 171. The concave groove portion 171*p* extends along the engaging direction Q3 in the center of the board width direction Q5 on the outer surface of the side wall portion 171*d*, and each of the both ends thereof opens on the outer surfaces of the open surface 171*a* and the bottom wall portion 171*f*. The bottom portion of the concave groove portion 171*p* is provided with a locked portion 171*q* to which the locking portion 171*n* of another electrical connection cassette 1 locks when the other electrical connection cassette 1 is connected. The locked portion 171*q* is formed into a side view triangular shape including an inclined surface that gradually rises from the bottom wall portion 171*f* side toward the open surface 171*a* side, and a stepped surface that is sharply lowered toward the open surface 171*a* before the open surface 171*a*.

Figure 9:
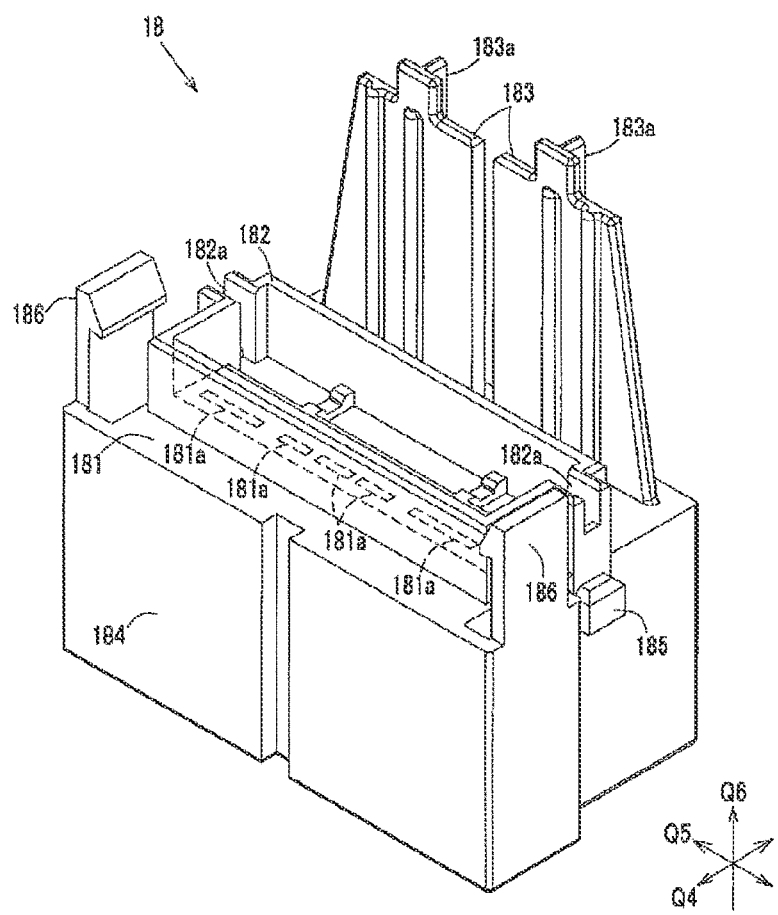
FIG. 9 is an enlarged perspective view illustrating a lower case of FIG. 3.

As illustrated in FIG. 9, the lower case 18 includes a board portion 181, for example in a rectangular flat plate shape, that closes the accommodation opening (that is, open surface 171*a*) of the upper case 17. A peripheral wall portion 182 that is inserted into the open surface 171*a* of the upper case 17 is provided in an upright manner on a main surface of the inside of the board portion 181 (that is, a main surface on the side of the engaging direction Q6). Note that the engaging direction Q6 is a direction in which the lower case 18 is relatively close to the upper case 17 when the upper case 17 and the lower case 18 are engaged.

Concave portions 182*a* to which the base end portion 10*c* on the opposite side of the circuit board 10 in the engaging direction Q1 is engaged are provided on both side walls of the peripheral wall portion 182 in the board width direction Q5.

Through holes 181*a*, through which the terminal main bodies 141, 151 of each of external connector terminals 14, 15 mounted on the circuit board 10 pass, are provided on a main surface of the board portion 181 inside the peripheral wall portion 182.

A pair of substantially rectangular projecting tabs 183 inserted into the accommodating space of the upper case 17 are provided in an upright manner on the main surface of the board portion 181 at positions offset from the center of the board width direction Q5 to both sides at the edge portion in the board orthogonal direction Q4. Ribs 183*a* that engage with the slits 171*k* of the upper case 17 are provided in an upright manner along the engaging direction Q6 on the outer main surface of each of the protruding tabs 183.

A peripheral wall shaped outer connector housing 184 that surrounds each external connector terminal 14, 15 protruding from the board portion 181 through each through hole 181*a* is provided in a peripheral portion of a main surface of the outside of the board portion 181 (that is, a main surface opposite the engaging direction Q6). The external connector housing 184 is formed in a shape that can engage with a connector housing of a mating connector from the outside (for example, a connector connected to the power feeder line 4 from the electrical connection box 2, or a connector connected to a signal line from the electrical connection box 2).

The outer surfaces on both sides of the outer connector housing 184 in the board width direction Q5 is provided with the pair of positioning protruding portions 185 that engage with the pair of positioning concave portions 171 h of the upper case 17, and a pair of locking claw shaped locking portions 186 that lock with the pair of locked portions 171i of the upper case 17 in a state of protrusion from an inner main surface of the board portion 181.

Method for Assembling Electrical Connection Cassette 1

Next, a method for assembling the electrical connection cassette 1 will be described with reference to FIGS. 2, 8 and 10.

First, as illustrated in FIG. 8, a circuit board 10 on which each circuit component (such as the metal members 11, 12 and the external connector terminals 14, 15) is mounted is accommodated inside the case main body 171 of the upper case 17. At this time, the circuit board 10 is inserted inside the case main body 171 from the open surface 171a of the case main body 171, with the first connection terminals 111, 121 side facing the engaging concave portion 173 side and the second connection terminals 112, 122 side facing the engaging convex portion 172, and with the side portions 10a on both sides of the circuit board 10 in the board width direction Q5 inserted into the guide rail 171 g provided on the inner surface on both sides of the case main body 171 along the engaging direction Q1.

Figure 10:
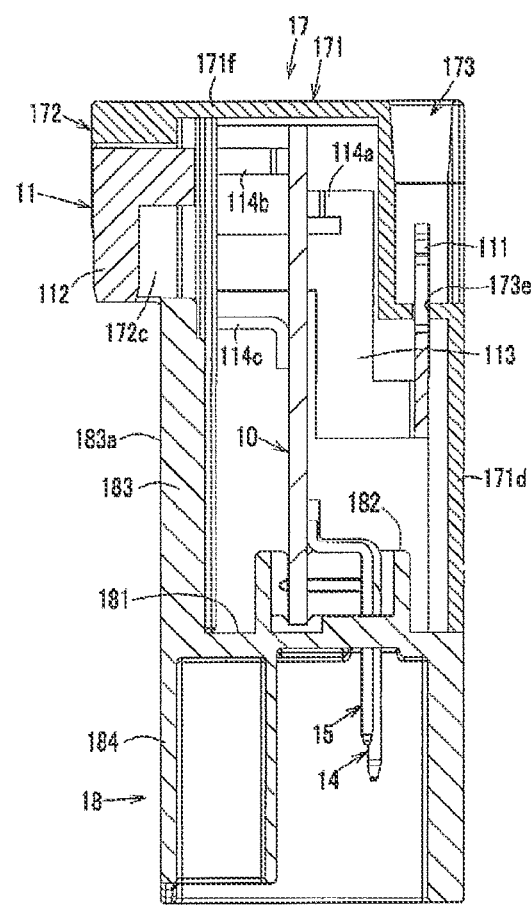
FIG. 10 is a cross-sectional view taken along B-B of FIG. 2A.

As illustrated in FIG. 2 and FIG. 10, the lower case 18 is engaged with the open surface 171a of the case main body 171. At this time, with the main surface of the board portion 181 on the side of the engaging direction Q6 facing the open surface 171a of the case main body 171, the lower case 18 is engaged with the open surface 171a of the case main body 171 along the engaging direction Q6.

In this engaged state, the pair of protruding tabs 183 of the lower case 18 are inserted into the pair of guide concave portions 171 m of the upper case 17, and the ribs 183a of the protruding tabs 183 engage with the slits 171k of the upper case 17. In the engaged state described above, the positioning concave portions 171 h on both sides of the upper case 17 and the positioning protruding portions 185 on both sides of the lower case 18 engage with each other, and the relative positions of the upper case 17 and the lower case 18 are determined. In the engaged state described above, the locking portions 186 on both sides of the lower case 18 lock with the locked portions 171i on both sides of the upper case 17, and the engagement between the upper case 17 and the lower case 18 is fixed.

In this way, the circuit board 10 on which the circuit components are mounted is accommodated in the housing 16 constituted by the upper case 17 and the lower case 18. In this accommodation state, each of first connection terminals 111, 121 mounted to the circuit board 10 is disposed in each engaging concave portion 173 of the upper case 17, each of second connection terminals 112, 122 mounted to the circuit board 10 is disposed in each accommodating concave portion 172c of the engaging convex portion 172 of the upper case 17, and each of the external connector terminals 14, 15 mounted on the circuit board 10 is disposed inside the external connector housing 184 through the through holes 181a of the board portion 181 of the lower case 18.

Method for Connection Between Electrical Connection Cassettes 1

Next, a method for connecting the same type electrical connection cassettes 1 will be described with reference to FIG. 11.

Figure 11:
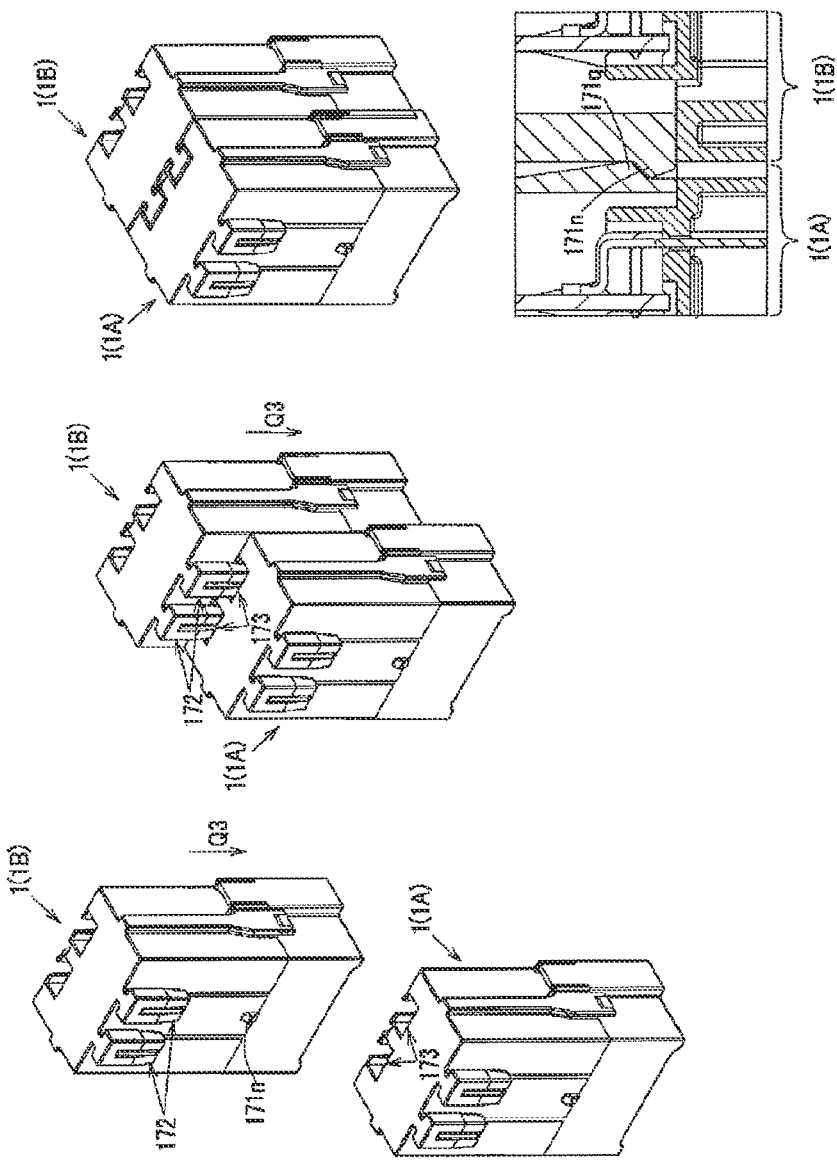
FIGS. 11A-11C are a diagram illustrating a method of connecting electrical connection cassettes together.

As illustrated in FIG. 11, a pair of engaging protruding portions 172 of one electrical connection cassette 1B of two electrical connection cassettes 1 (1A, 1B) are engaged inside a pair of engaging concave portions 173 (FIG. 11C), with the tip surface on the side of the engaging direction Q3 inserted into the opening portion 173a of the pair of engaging concave portions 173 of the other electrical connection cassette 1A (FIGS. 11A and 11B).

In the engaged state described above, the tip surface on the side of the engaging direction Q3 of the engaging convex portion 172 of the one electrical connection cassette 1B abuts the back surface of each engaging concave portion 173 of the other electrical connection cassette 1A. In the engaged state described above, as illustrated in FIG. 11C, the locking portions 171n provided on the outer surface of the one electrical connection cassette 1B moves along the concave groove portion 171p provided on the outer surface of the other electrical connection cassette 1A to lock the locked portions 171q. This locking allows each electrical connection cassette 1A, 1B to be mechanically connected to each other. Note that by pulling the one electrical connection cassette 1B from the other electrical connection cassette 1A with a force above a certain level, locking of the locking portions 171n and the locked portions 171q described above is released, and the mechanical connection of each electrical connection cassette 1A, 1B can be separated.

Moreover, in the engaged state described above, the second connection terminals 112, 122 in each engaging convex portion 172 of the one electrical connection cassette 1B and the first connection terminals 111, 121 in each engaging concave portion 173 of the other electrical connection cassette 1A are electrically connected to each other.

Then, as illustrated in the cassette connection body 7a of FIG. 1, when the external connector 50 connected to the power feeder line 4a from the electrical connection box 2 is connected to the external connector housing 184 of the other electrical connection cassette 1A, and the external connector 51 connected to the power feeder line 4b connected to the onboard device 3 is connected to the external connector housing 184 of the one electrical connection cassette 1B, power supplied from the electrical connection box 2 energizes each external connector terminal 14 and each metal member 11, 12 of the other electrical connection cassette 1A from the external connector 50 and energizes each metal member 11, 12 and each external connector terminal 14 of the one electrical connection cassette 1B, and is supplied from the external connector 51 to the onboard device 3 side.

Note that in the above description, two electrical connection cassettes 1 are connected to each other, but the same applies to a case where three or more electrical connection cassettes 1 are connected to each other.

Primary Effects

The electrical connection cassette 1 according to this embodiment is provided with: a circuit board 10; and first connection terminals 111, 121 and second connection terminals 112, 122 mounted on the circuit board 10 and having terminal shapes that can engage with each other. In a state with a terminal connection direction Q8 oriented in a predetermined direction with respect to the circuit board 10, the first connection terminals 111, 121 are disposed on the side of one main surface 10e of the circuit board 10, and in a state with a terminal connection direction Q9 oriented in a direction parallel to the predetermined direction, the second connection terminals 112, 122 are disposed near the other main surface 10f of the circuit board 10.

According to this configuration, since the first connection terminals 111, 121 and the second connection terminals 112, 122 each have a terminal shape that can be engaged with each other, the electrical connection cassettes 1 can be electrically connected to each other by connecting the first connection terminals 111, 121 and the second connection terminals 112, 122 to each other between the electrical connection cassettes 1. Accordingly, the same type of electrical connection cassettes 1 having the same or different functions can be connected to each other to provide an electrical connection cassette 1 that can freely expand the device and add functions in accordance with the size of the free space.

Since the first connection terminals 111, 121 and the second connection terminals 112, 122 are respectively disposed on the one main surface 10e and the other main surface 10f of the circuit board 10, when the electrical connection cassettes 1 are connected to each other, the circuit board 10 can be disposed in the thickness direction thereof, and thus the electrical connection cassettes 1 can be connected compactly.

Because the terminal connection directions Q8, Q9 of each of the first connection terminals 111, 121 and the second connection terminals 112, 122 are oriented in a direction parallel to the predetermined direction, when the electrical connection cassettes 1 are connected to each other, the connection direction between the electrical connection cassettes 1 is easily recognized, and the connection workability of connecting the electrical connection cassettes 1 to each other can be improved.

Since metal members 11, 12 including the first connection terminals 111, 121, the second connection terminals 112, 122, and a connecting portion 113, 123 that connects the first connection terminals 111, 121 and the second connection terminals 112, 122 are provided, the first connection terminals 111, 121 and the second connection terminals 112, 122 can be integrated by the connecting portion 113, 123 in the metal members 11, 12. As a result, components such as harnesses required for connecting in the related art can be unnecessary, so the number of parts can be reduced and assembly workability for assembling the electrical connection cassette 1 can be improved, and the first connection terminals 111, 121 and the second connection terminals 112, 122 can be reliably conducted.

Note that in this embodiment, the first connection terminals 111, 121 and the second connection terminals 112, 122 are integrated via the metal members 11, 12, but the first connection terminals 111, 121 and the second connection terminals 112, 122 may be mounted to the circuit board 10 separately without being integrated.

Because the metal members 11, 12 are provided on each of the side portions 10a on both sides of the circuit board 10, the connection force when connecting the electrical connection cassettes 1 to each other acts on the side portions 10a on both sides of the circuit board 10, and the electrical connection cassettes 1 can be connected to each other smoothly with balanced force.

Even when an external force acts on the other electrical connection cassette 1 from the one electrical connection cassette 1 in a connected state between the electrical connection cassettes 1, the external force on the other electrical connection cassette 1 is dispersed in the metal members 11, 12 on both sides, so that a stable connection (i.e., a connection between the metal members 11, 12 and the circuit board 10 and/or a connection between the metal members 11 (12) of each electrical connection cassette 1) can be ensured.

Because the connecting portions 113, 123 of the metal members 11, 12 are bent so as to be bent from on the one main surface 10e of the circuit board 10 to the edge side of the circuit board 10 to reach the other main surface 10f of the circuit board 10, the first connection terminals 111, 121 and the second connection terminals 112, 122 can be disposed closer to the center of the main surface of the circuit board 10.

A cutout portion 10b is provided on an outer periphery of the circuit board 10, and the metal members 11, 12 are disposed around the outer periphery of the circuit board 10 with the connecting portion 113 engaged with the cutout portion 10b, so it is possible to prevent the metal members 11, 12 from projecting from the outer periphery of the circuit board 10. Furthermore, when the side portions 10a on both sides of the circuit board 10 are inserted into guide rails 171g provided on the inner surfaces on both sides of the housing 16, and the circuit board 10 is accommodated in the housing 16, it is possible to prevent the metal members 11, 12 disposed on the side portions 10a on both sides of the circuit board 10 from interfering with the guide rails 171g.

Since the metal members 11, 12 include clamping portions 114, 124 sandwiching the circuit board 10 from both sides and clamping portions 114c, 124c as an electrical connection portion that is electrically connected to an electrical path formed on the circuit board 10, the metal members 11, 12 and the circuit board 10 can be mechanically connected by the clamping portions 114, 124, and the metal members 11, 12 and the electrical path of the circuit board 10 can be electrically connected by the clamping portions 114c, 124c as an electrical connection portion.

Additionally, because the metal members 11, 12 are electrically connected to the electrical path formed on the circuit board 10, heat generated in a circuit component mounted to the circuit board 10 can be dissipated from the metal members 11, 12 through the electrical path formed on the circuit board 10. Therefore, because the metal members 11, 12 function as a heat dissipating portion, it is not necessary to provide a separate heat dissipating portion, and the electrical connection cassette 1 can be made compact.

Since each of the first connection terminals 111, 121 and the second connection terminals 112, 122 is formed in a plate shape, and the main surface of one of the first connection terminals 111, 121 and the second connection terminals 112, 122 is disposed perpendicular to the circuit board 10, and the main surface of the other connection terminal is arranged parallel to the circuit board 10, the first connection terminals 111, 121 and the second connection terminals 112, 122 are arranged in an arrangement suitable for a terminal shape that connects to each other by intersecting the main surfaces thereof, and the first connection terminals 111, 121 and the second connection terminals 112, 122 can be connected to each other with a simple structure. In this embodiment, the first connection terminals 111, 121 are formed in a tuning-fork shaped terminal and the second connection terminals 112, 122 are formed in a tab shaped terminal, for example, as a terminal shape suitable for such an arrangement.

Because the terminal connection directions Q8. Q9 of the first connection terminals 111, 121 and the second connection terminals 112, 122 are opposite to each other, when the electrical connection cassettes 1 are connected to each other, the connection directions between the electrical connection cassettes 1 are the same, and the connection workability of connecting the electrical connection cassettes 1 to each other can be improved.

Since the position P1 of the first connection terminals 111, 121 with respect to the circuit board 10 and the position P2 of the second connection terminals 112, 122 with respect to the circuit board 10 coincide in a front view with respect to the main surface of the circuit board 10, each electrical connection cassette 1 can be prevented from being misaligned in a direction parallel to the main surface of the circuit board 10, with the electrical connection cassettes 1 connected to each other. Thus, the electrical connection cassettes 1 can be connected to each other in a compact size.

Since a housing 16, which accommodates the circuit board 10, the first connection terminals 111, 121, and the second connection terminals 112, 122, is provided, and the housing 16 includes an engaging convex portion 172 formed in a shape convex toward an outer surface of the housing 16 and an engaging concave portion 173 formed in a shape concave toward the outer face of the housing 16 and capable of engaging with the engaging convex portion 172, the electrical connection cassettes 1 can be mechanically connected to each other by engaging the engaging convex portion 172 and the engaging concave portion 173 to each other between the electrical connection cassettes 1.

Additionally, since the engaging convex portion 172 includes an accommodating concave portion 172c recessed inwardly from a tip surface on a side in the engaging direction Q3, and the second connection terminals 112, 122 are accommodated in the accommodating concave portion 172c of the engaging convex portion 172, and the first connection terminals 111, 121 are accommodated in the engaging concave portion 173, a space at which the engaging concave portion 173 and the engaging convex portion 172 are disposed can also serve as a space at which the first connection terminals 111, 121 and the second connection terminals 112, 122 are disposed, and the electrical connection cassette 1 can be made compact. Moreover, the first connection terminals 111, 121 and the second connection terminals 112, 122 can be connected to each other by simply engaging the engaging convex portion 172 and the engaging concave portion 173 to each other between the electrical connection cassettes 1.

Note that in this embodiment, the second connection terminals 112, 122 are accommodated in the accommodating concave portion 712c of the engaging convex portion 172, and the first connection terminals 111, 121 are accommodated in the engaging concave portion 173, but the first connection terminals 111, 121 may be accommodated in the accommodating concave portion 712c of the engaging convex portion 172, and the second connection terminals 112, 122 may be accommodated in the engaging concave portion 173.

The engaging convex portion 172 is formed in a shape in which a cross-sectional shape extends along the engaging direction Q3 of the engaging convex portion 172, and the cross-sectional shape includes a first widened portion 172a and a first narrowed portion 172b that connects with the first widened portion 172a and the outer surface of the housing 16 and that is narrower than the first widened portion 172a. The engaging concave portion 173 includes an aperture shaped opening portion 173a on the outer face of the housing 16 that is capable of engaging with the cross-sectional shape of the engaging convex portion 172. The aperture shape is formed in a shape extending along the engaging direction Q3 of the engaging concave portion 173, and the aperture shape includes a second widened portion 173c to which the first widened portion 172a of the engaging convex portion 172 can engage, and a second narrowed portion 173d communicating with the second widened portion 173c and the outer surface of the housing 16, with a width capable of engaging the first narrowed portion 172b of the engaging convex portion 172. Therefore, the engaging structure between the engaging convex portion 172 and the engaging concave portion 173 can be a slide engaging structure.

The electrical connection cassettes 1 are connected to each other by the first connection terminals 111, 121 and the second connection terminals 112, 122 between the electrical connection cassette 1 and another electrical connection cassette 1, and thus electrical connection is possible between the same type electrical connection cassettes 1.

The electrical connection cassettes 1 are connected to each other by engaging the engaging convex portion 172 and the engaging concave portion 173 with each other between the electrical connection cassette 1 and another electrical connection cassette 1, hence mechanical connection is possible between the same type electrical connection cassettes 1.

Further, since the circuit board 10 is provided with a functional circuit configuring one or more functions from among a relay function that blocks or conducts an electrical path formed on the circuit board 10, a fuse function that blocks the electrical path when a time integral value of a fixed time of a current flowing through the electrical path formed on the circuit board 10 is greater than or equal to a predetermined integral value, a voltage monitoring function for outputting a reset signal when a voltage of the electrical path formed on the circuit board 10 is less than or equal to a predetermined voltage value, a filter function that removes noise flowing in the electrical path formed on the circuit board 10, and a backup capacitor function that supplies power when the power supply is switched off, the electrical connection cassette 1 may be implemented with various functions.

Variation 1

In the embodiment described above, the first connection terminals 111, 121 are formed in a tuning-fork shaped terminal and the second connection terminals 112, 122 are formed in a tab shaped terminal, but either the first connection terminals 111, 121 or the second connection terminals 112, 122 may be formed as convex-shaped terminals while either the first connection terminals 111, 121 or the second connection terminals 112, 122 may be formed as concave terminals capable of engaging with the convex shape described above. As a result, the first connection terminals 111, 121 and the second connection terminals 112, 122 can be connected to each other with a simple structure.

Variation 2

Figure 12:
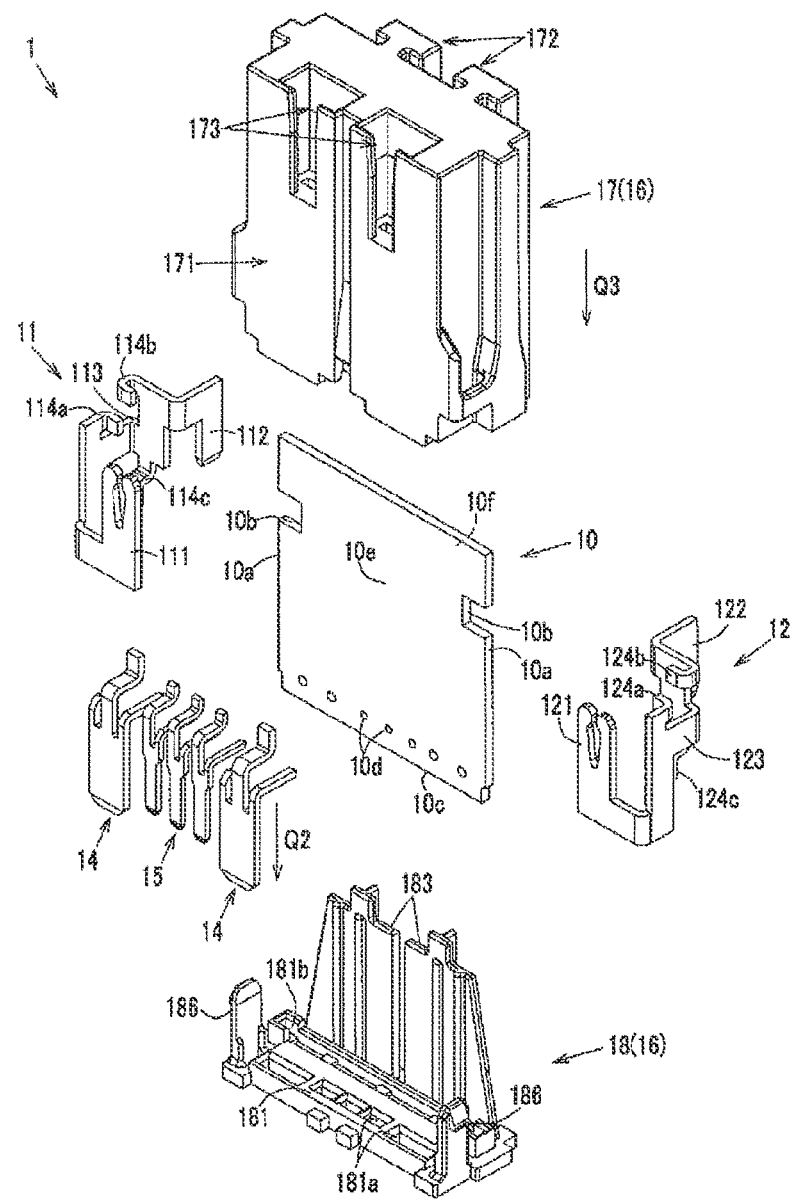
FIG. 12 is an exploded perspective view illustrating a variation of the lower case of the electrical connection cassette.
Figure 13:
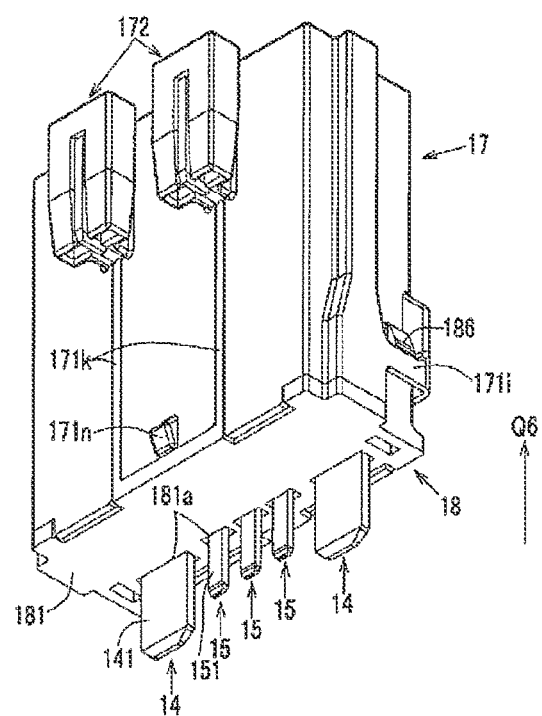
FIG. 13 is a perspective view of the electrical connection cassette viewed from the side of an external connector terminal.

In the above embodiment, the lower case 18 includes the outer connector housing 184, but as illustrated in FIGS. 12 and 13, the lower case 18 may be shaped without the outer connector housing 184. In this case, the terminal main body 141, 151 of each external connector terminal 14, 15 protrudes from the lower case 18 and is exposed. In this case, each terminal main body 141, 151 protruding from the lower case 18 functions as an edge connector terminal, and can be connected to an edge connector socket mounted on an external circuit board.

Note that as illustrated in FIG. 12 and FIG. 13, in the lower case 18 of this variation, the pair of positioning protruding portions 185 are omitted as the external connector housing 184 is omitted. As a result, the pair of positioning concave portions 171h are omitted in the upper case 17 of this variation. In the lower case 18 of this variation, the peripheral wall portion 182 is omitted, and a concave groove portion 181*b* that can be engaged with a base end portion 10*c* on the side opposite the engaging direction Q1 of the circuit board 10 is provided on the main surface on the side of the engaging direction Q6 of the board portion 181.

Example 2

Next, Example 2, in which the connecting direction of the electrical connection cassette differs from that in Example 1, in which the electrical connection cassette 1 can be connected in the board orthogonal direction Q4, will be described with reference to FIGS. 14 to 16.

Figure 14:
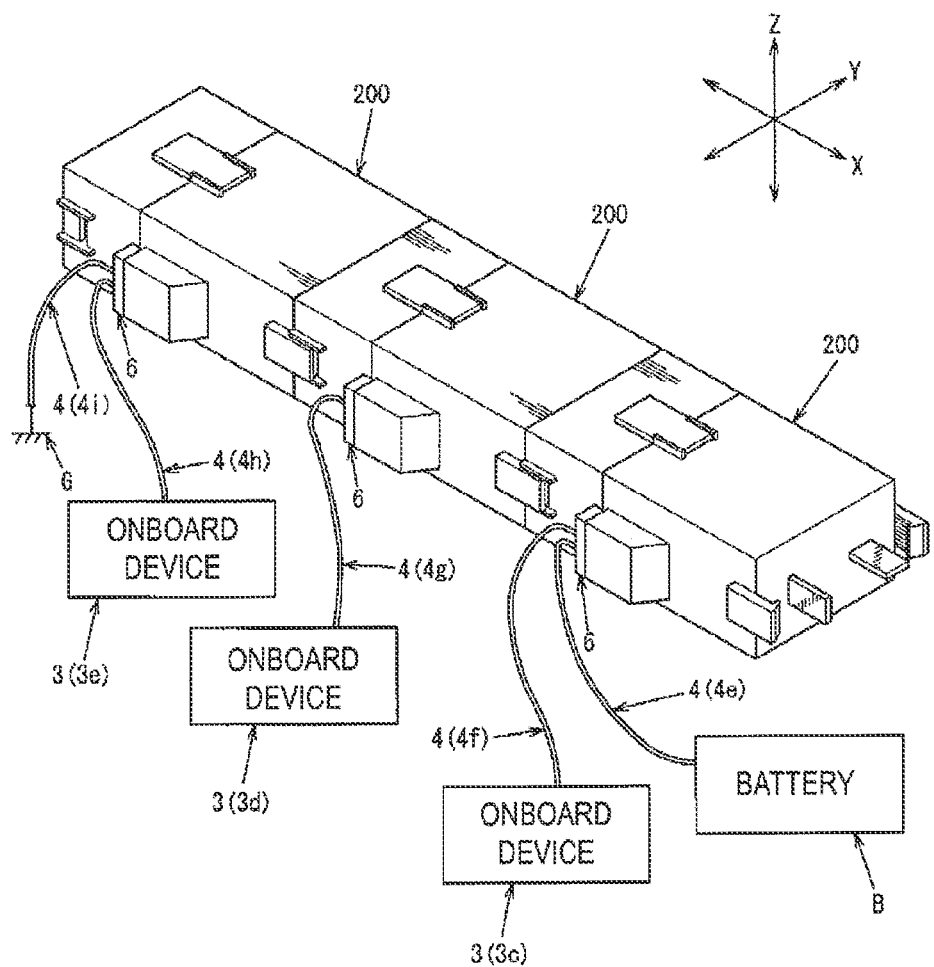
FIG. 14 is an explanatory diagram illustrating an example of use of an electrical connection cassette according to Example 2.
Figure 15A:
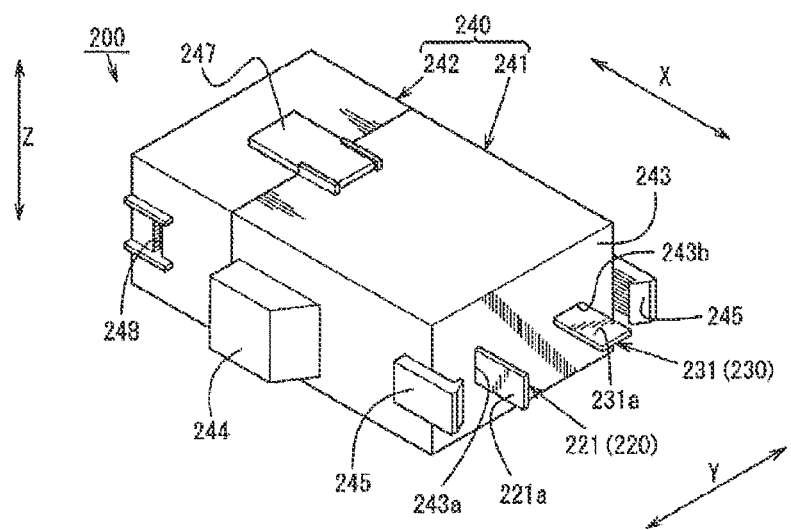
FIGS. 15A-15B are an external perspective view illustrating an appearance of the electrical connection cassette according to Example 2.
Figure 15B:
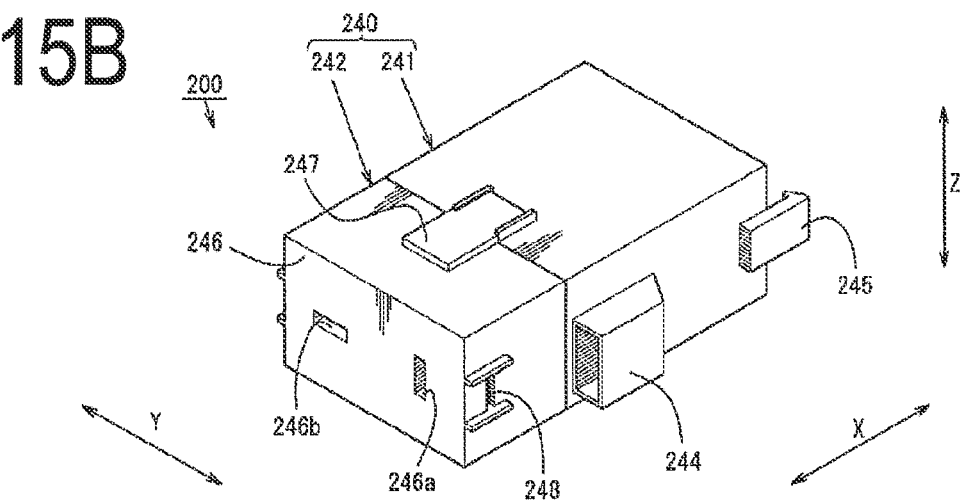
Figure 16:
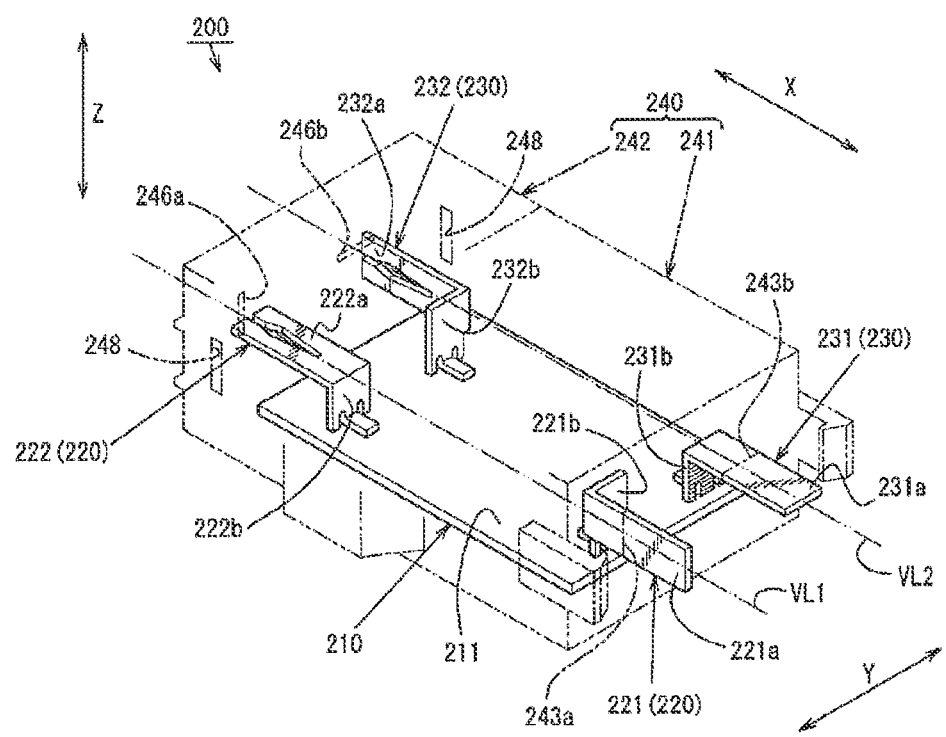
FIG. 16 is an external perspective view illustrating an appearance of an internal configuration of the electrical connection cassette according to Example 2.

Note that FIG. 14 illustrates an explanatory diagram illustrating an example of use of an electrical connection cassette 200 in Example 2, FIG. 15 illustrates an external perspective view of the electrical connection cassette 200, and FIG. 16 illustrates an external perspective view of an internal configuration of the electrical connection cassette 200.

FIG. 15A illustrates an external perspective view of the electrical connection cassette 200 viewed from one side of the X-axis direction, and FIG. 15B illustrates an external perspective view of the electrical connection cassette 200 viewed from the other side of the X-axis direction.

For ease of explanation, description will be given under the assumption that the engaging direction Q1 in Example 1 and the engaging direction Q3 opposite to the engaging direction Q1 are the X-axis direction, the board width direction Q5 of Example 1 is the Y-axis direction, and the board orthogonal direction Q4 of Example 1 is the Z-axis direction.

The arrow X in the drawing indicates the X-axis direction, the arrow Y in the drawing indicates the Y-axis direction, the arrow Z in the drawing indicates the Z-axis direction, the right side in the drawing in the X-axis direction is one side of the X-axis direction, and the left side in the drawing in the X-axis direction is the other side of the X-axis direction.

As illustrated in FIG. 14, the electrical connection cassette 200 of Example 2 is configured to be capable of connecting the electrical connection cassettes 200 having same configuration in the X-axis direction. Then, for example, of the three electrical connection cassettes 200 connected in the X-axis direction, an electrical connection cassette 200 located on one side in the X-axis direction (right side in FIG. 14) is, as illustrated in FIG. 14, connected to the battery B via the power feeder line 4 (4*e*) and is connected to the onboard device 3 (3*c*) via the power feeder line 4 (4*f*).

Furthermore, an electrical connection cassette 200 located in the center in the X-axis direction is connected to the onboard device 3 (3*d*) via the power feeder line 4 (4*g*). In addition, an electrical connection cassette 200 located on the other side in the X-axis direction (the left side in FIG. 14) is connected to the onboard device 3 (3*e*) via the power feeder line 4 (4*h*) and is connected to the ground G via the power feeder line 4 (4*i*).

As illustrated in FIG. 15 and FIG. 16, each electrical connection cassette 200 includes a circuit board 210, a first set terminal 220 and a second set terminal 230 mounted to the circuit board 210, a plurality of external connector terminals (not illustrated) mounted on the circuit board 210, and a substantially rectangular parallelepiped shaped housing 240 that accommodates and holds the circuit board 210.

As illustrated in FIG. 16, the circuit board 210 is formed in a flat plate shape that is a rectangular plate shape as seen in plan view, has a thickness in the Z-axis direction and includes a main surface parallel to the X-axis direction and the Y-axis direction. The circuit board 210, similar to Example 1, is provided with electrical circuits (not illustrated) and circuit components (not illustrated) that implement various functions on the main surface 211 (hereinafter, referred to as the one main surface 211) on one side (the upper side of FIG. 16) in the Z-axis direction. Note that the electrical circuits (not illustrated) and the circuit components (not illustrated) are electrically connected to external connector terminals via the circuit board 210.

The first and second set terminals 220, 230 are mounted to the one main surface 211 of the circuit board 210 at predetermined intervals in the Y-axis direction, as illustrated in FIGS. 15 and 16.

Either one set of the first set terminals 220 or the second set terminals 230 is configured as a positive terminal connected to the battery B via the power feeder line 4 (4*e*), while the other set is configured as a negative terminal connected to the ground G via the power feeder line 4 (4*i*).

Thus, the first and second set terminals 220, 230 serve as a path for powering the adjacent electrical connection cassettes 200 in a state in which the electrical connection cassettes 200 are connected together.

Specifically, one of the first set terminal 220 and the second set terminal 230 functions as part of a path for current flowing from the battery B to the onboard device 3, and the other set terminal functions as part of a path for current flowing from the onboard device 3 to the ground G. As a result, the number of power feeder lines connected to the plurality of electrical connection cassettes 200 connected in the X-axis direction, in particular, the number of power feeder lines 4 (4*e*) connected to the battery B and the power feeder lines 4 (4*i*) connected to the ground G can be reduced.

As illustrated in FIG. 16, the first set terminal 220 includes one first male connection terminal 221 disposed at an end of the circuit board 210 on one side in the X-axis direction (the right side in FIG. 16), and one first female connection terminal 222 disposed at an end of the circuit board 210 on the other side in the X-axis direction (the left side in FIG. 16). Note that the first male connection terminal 221 and the first female connection terminal 222 are electrically connected via the circuit board 210.

As illustrated in FIG. 16, the first male connection terminal 221 is integrally formed with the male connection portion 221*a* with a tip portion exposed to one side in the X-axis direction with respect to one end surface 243 of the housing 240 described below, and a terminal base portion 221*b* that electrically connects the male connection portion 221*a* and the circuit board 210.

The male connection portion 221*a* of the first male connection terminal 221 has a thickness in the Y-axis direction and is formed in a substantially flat plate shape having a plane substantially orthogonal to the main surface of the circuit board 210.

On the other hand, as illustrated in FIG. 16, the first female connection terminal 222 is integrally formed with a female connection portion 222*a* having a tip portion disposed inside the housing 240 and a terminal base portion 222*b* that electrically connects the female connecting portion 222*a* and the circuit board 210.

As illustrated in FIG. 16, the female connection portion 222*a* of the first female connection terminal 222 is formed in a shape having a thickness in the Z-axis direction and a plane substantially parallel to the main surface of the circuit board 210. More specifically, the female connection portion 222*a* of the first female connection terminal 222 is formed in a substantially tuning-fork shape that opens at an interval, which is slightly narrower than the thickness of the male connection part 221a of the first male connection terminal 221.

As illustrated in FIG. 16, the first set terminal 220 having the configuration described above is disposed facing in the X-axis direction so that substantially the center in the Y-axis direction of the male connection portion 221a and substantially the center in the Y-axis direction of the female connection portion 222a are positioned on a virtual straight line VL1 along the X-axis direction, and substantially the center of the male connection portion 221a in the Z-axis direction and substantially the central of the female connection portion 222a in the Z-axis direction are disposed on the virtual straight line VL1 along the X-axis direction.

In other words, in the Z-axis direction viewed from the Z-axis direction, the first set terminal 220 is configured so that the male connection portion 221a and the female connection portion 222a are disposed so as to face each other on the virtual straight line VL1 along the X-axis direction.

More particularly, the first set terminal 220 is configured so that the first male connection terminal 221 and the first female connection terminal 222 are disposed opposite each other, with a contact portion of the male connection portion 221a that is the contact point with the female connection portion 222a of an adjacent electrical connection cassette 200 and a contact portion of the female connection portion 222a that is the contact point with the male connection portion 221a of another adjacent electrical connection cassette 200 being positioned on the virtual straight line VL1.

In other words, the male connection portion 221a and the female connection portion 222a of the first set terminal 220 are formed in corresponding shapes that can be concave-convex engaged and connected in the X-axis direction.

As illustrated in FIG. 16, the second set terminal 230 is constituted by a second male connection terminal 231 disposed at an end portion of the circuit board 210 on one side in the X-axis direction (the right side in FIG. 16), and a single second female connection terminal 232 disposed at an end of the circuit board 210 on the other side in the X-axis direction (the left side in FIG. 16). Note that the second male connection terminal 231 and the second female connection terminal 232 are electrically connected via the circuit board 210.

As illustrated in FIG. 16, the second male connection terminal 231 is integrally formed with a male connection portion 231a having a tip portion exposed to one side in the X-axis direction from the housing 240 and a terminal base portion 231b that electrically connects the male connection portion 231a and the circuit board 210.

The male connection portion 231a of the second male connection terminal 231 has a thickness in the Z-axis direction and is formed in a substantially flat plate shape having a plane substantially parallel to the main surface of the circuit board 210.

On the other hand, as illustrated in FIG. 16, the second female connection terminal 232 is integrally formed with a female connection portion 232a having a tip portion disposed inside the housing 240 and a terminal base portion 232b that is electrically connected to the circuit board 210.

As illustrated in FIG. 16, the female connection portion 232a of the second female connection terminal 232 is formed in a shape having a thickness in the Y-axis direction and a plane substantially orthogonal to the main surface of the circuit board 210. More specifically, the female connection portion 232a of the second female connection terminal 232 is formed in a substantially tuning-fork shape that opens at an interval, which is slightly narrower than the thickness of the male connection part 231a of the second male connection terminal 231.

As illustrated in FIG. 16, the second set terminal 230 having the configuration described above is disposed facing in the X-axis direction so that substantially the center of the male connection portion 231a in the Y-axis direction and substantially the center of the female connection portion 232a in the Y-axis direction are positioned on the virtual straight line VL2 along the X-axis direction, and substantially the center of the male connection portion 231a in the Z-axis direction and substantially the central of the female connection portion 232a in the Z-axis direction are positioned on the virtual straight line VL2 along the X-axis direction.

In other words, in the Z-axis direction view that is viewed from the Z-axis direction, the second set terminal 230 is configured so that the male connection portion 231a and the female connection portion 232a are disposed so as to face each other on the virtual straight line VL2 along the X-axis direction.

More particularly, the second set terminal 230 is configured so that the second male connection terminal 231 and the second female connection terminal 232 are disposed opposite each other, with a contact portion of the male connection portion 231a that is the contact point with the female connection portion 232a of an adjacent electrical connection cassette 200, and a contact portion of the female connection portion 232a that is the contact point with the male connection portion 231a of another adjacent electrical connection cassette 200 being positioned on the virtual straight line VL2.

In other words, the male connection portion 231a and the female connection portion 232a of the second set terminal 230 are formed in corresponding shapes that can be concave-convex engaged and connected in the X-axis direction.

The external connector terminals are provided for electrically connecting the battery B, the onboard device 3, the ground G, and the circuit board 210 via the external connectors 6 (see FIG. 14). One end of the external connector terminal is electrically connected to the circuit board 210, and the other end is accommodated in the connector connection portion 244 of the housing 240, which will be described below.

As illustrated in FIGS. 15 and 16, the housing 240 is formed in a substantially rectangular parallelepiped shape with an internal hollow shape by assembling an upper case 241 and a lower case 242 in the X-axis direction, similar to Example 1 described above.

The upper case 241 is formed in a substantially rectangular parallelepiped shape having an opening on the other side in the X-axis direction. As illustrated in FIGS. 15A and 16, the upper case 241 has an opening portion 243a that exposes the male connection portion 221a of the first set terminal 220 to the outside on one end surface 243 which is an end surface on one side in the X-axis direction, and an opening portion 243b that exposes the male connection portion 231a of the second set terminal 230, each independently formed with opening.

In addition, as illustrated in FIG. 15, in the upper case 241, a pair of locking protrusions (not illustrated) are formed facing each other in the Z-axis direction in planes facing in the Z-axis direction on the other side in the X-axis direction. Note that the pair of locking protrusions in the upper case 241 lock a locking claw 247 of the lower case 242, which will be described below.

Furthermore, as illustrated in FIG. 15, in the upper case 241, a connector connection portion 244 is formed protruding in the Y-axis direction in a plane in the Y-axis direction on the other side in the X-axis direction. Note that the connector connection portion 244 of the upper case 241 is formed so as to be capable of being connected to the external connector 6 from the other side in the X-axis direction.

As illustrated in FIG. 15, in the upper case 241, a pair of engaging convex portions 245 are formed so as to face each other in the Y-axis direction in planes facing in the Y-axis direction on one side in the X-axis direction.

As illustrated in FIG. 15, the engaging convex portion 245 is formed in a substantially claw shape that extends toward one side in the X-axis direction with respect to the one end surface 243 of the housing 240, with the tip thereof protruding toward the other engaging convex portion 245.

On the other hand, the lower case 242 is formed in a substantially rectangular parallelepiped shape with an opening on one side in the X-axis direction. As illustrated in FIG. 15B and FIG. 16, the lower case 242 includes an opening portion 246a having an opened portion facing the female connection portion 222a of the first set terminal 220, and an opening portion 246b having an opened portion facing the female connection portion 232a of the second set terminal 230, each formed independently on the other end surface 246 which is the end surface on the other side in the X-axis direction.

In addition, as illustrated in FIG. 15, in the lower case 242, a pair of locking claws 247 are formed facing each other in the Z-axis direction in planes facing in the Z-axis direction on one side in the X-axis direction. Each locking claw 247 of the lower case 242 is formed so as to be able to lock the pair of locking protrusions in the upper case 241.

Furthermore, as illustrated in FIG. 15, in the lower case 242, a pair of engaging concave portions 248 facing in the X-axis direction with respect to the pair of engaging convex portions 245 are formed with an opening in planes facing in the Y-axis on the other side in the X-axis direction. In the pair of engaging concave portions 248 in the lower case 242, the pair of engaging convex portions 245 are formed with an opening in a shape that is concave-convex engaged from the outer direction in the Y-axis direction.

In other words, the pair of engaging convex portions 245 and the pair of engaging concave portions 248 described above are formed in a concave-convex shape that can be concave-convex engaged along the X-axis direction.

Subsequently, steps of connecting the plurality of electrical connection cassettes 200 in the X-axis direction in Example 2 described above will be briefly described.

First, the other end surface 246 of another electrical connection cassette 200 is brought into proximity with the one end surface 243 of the electrical connection cassette 200 along the X-axis direction.

The male connection portion 221a of the first set terminal 220 and the male connection portion 231a of the second set terminal 230 are inserted into the opening portion 246a and the opening portion 246b of another electrical connection cassette 200 along the X-axis direction, respectively. Thereafter, the male connection portion 221a of the first set terminal 220 and the male connection portion 231a of the second set terminal 230 in the electrical connection cassette 200 are respectively engaged and connected to the female connection portion 222a of the first set terminal 220 and the female connection portion 232a of the second set terminal 230 in another electrical connection cassette 200, along the X-axis direction respectively.

Furthermore, the pair of engaging convex portions 245 of the electrical connection cassette 200 are brought into proximity with the pair of engaging concave portions 248 in another electrical connection cassette 200 along the X-axis direction, and the engaging convex portions 245 and the engaging concave portions 248 are concave-convex engaged from outside in the Y-axis direction to complete the engagement connection between the electrical connection cassettes 200.

As described above, the electrical connection cassette 200 of Example 2 is configured so as to be capable of engaging together the electrical connection cassettes 200 in the X-axis direction, which is a direction substantially parallel to the one main surface 211 of the circuit board 210, and a direction substantially perpendicular to the one end surface 243 and the other end surface 246 of the housing 240, as the engaging direction of the housing 240.

In addition, the electrical connection cassettes 200 are configured so as to be able to electrically connect electrical connection cassettes 200 with each other in the X-axis direction, which is a direction substantially parallel to the plane of the male connection portion 221a and the plane of the female connection portion 222a in the first set terminal 220 and the plane of the male connection portion 231a and the plane of the female connection portion 232a in the second set terminal 230, as the terminal connection direction.

According to the electrical connection cassette 200 according to the present embodiment, the circuit board 210, the first male connection terminal 221 and the first female connection terminal 222 disposed substantially opposite to each other in the X-axis direction, which is a direction substantially parallel to the one main surface 211 of the circuit board 210, and mounted on the circuit board 210, and a substantially rectangular parallelepiped shaped housing 240 that accommodates and holds the circuit board 210 are provided. The housing 240 includes an engaging convex portion 245 formed in a convex shape and an engaging concave portion 248 formed in a concave shape, both being formed in a concave-convex shape and formed so as to face each other in the X-axis direction and corresponding to each other. The first male connection terminal 221 and the first female connection terminal 222 are formed in corresponding shapes that can be engaged to each other along the X-axis direction, and configured to be electrically conductive in a state where the housing 240 and another housing 240 adjacent in the X-axis direction are concave-convex engaged along the X-axis direction.

According to this configuration, the electrical connection cassette 200 can achieve the same effects as Example 1 described above.

Specifically, the electrical connection cassette 200 can connect be connected to another electrical connection cassette 200 other along the X-axis direction, and therefore, the device can be freely expanded and added with functions in accordance with the size of the free space.

Example 3

Next, similar to Example 2, Example 3, in which the engaging direction and the terminal connection direction differ in electrical connection cassettes connectable in the X-axis direction, will be described with reference to FIGS. 17 and 18.

Figure 17A:
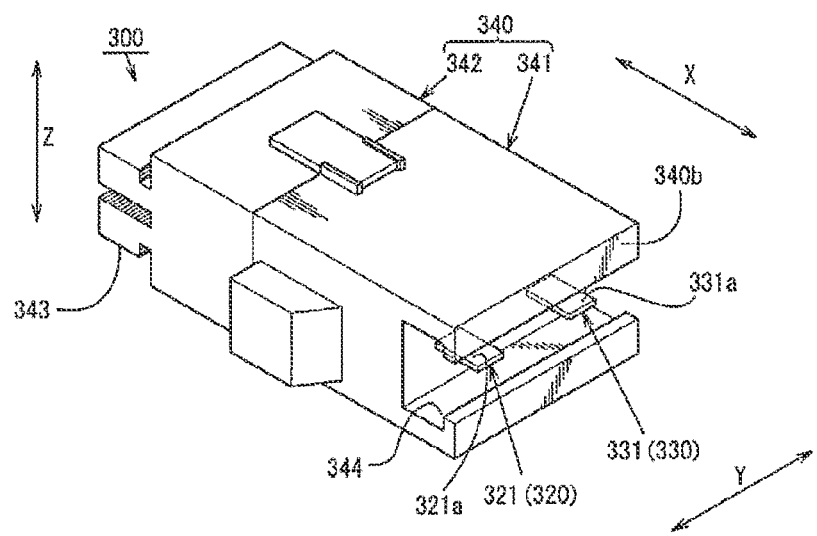
FIGS. 17A-17B are an external perspective view illustrating an appearance of an electrical connection cassette according to Example 3.
Figure 17B:
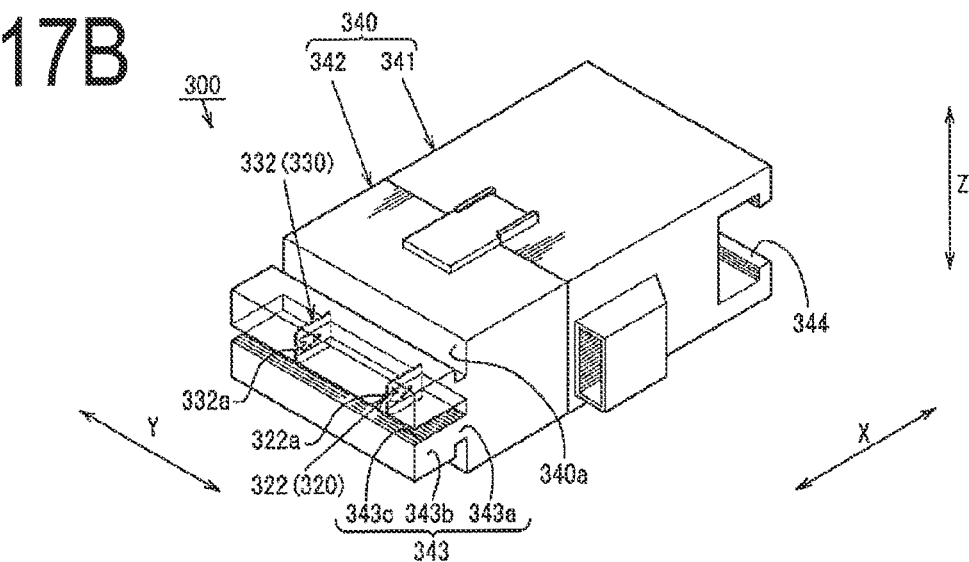
Figure 18:
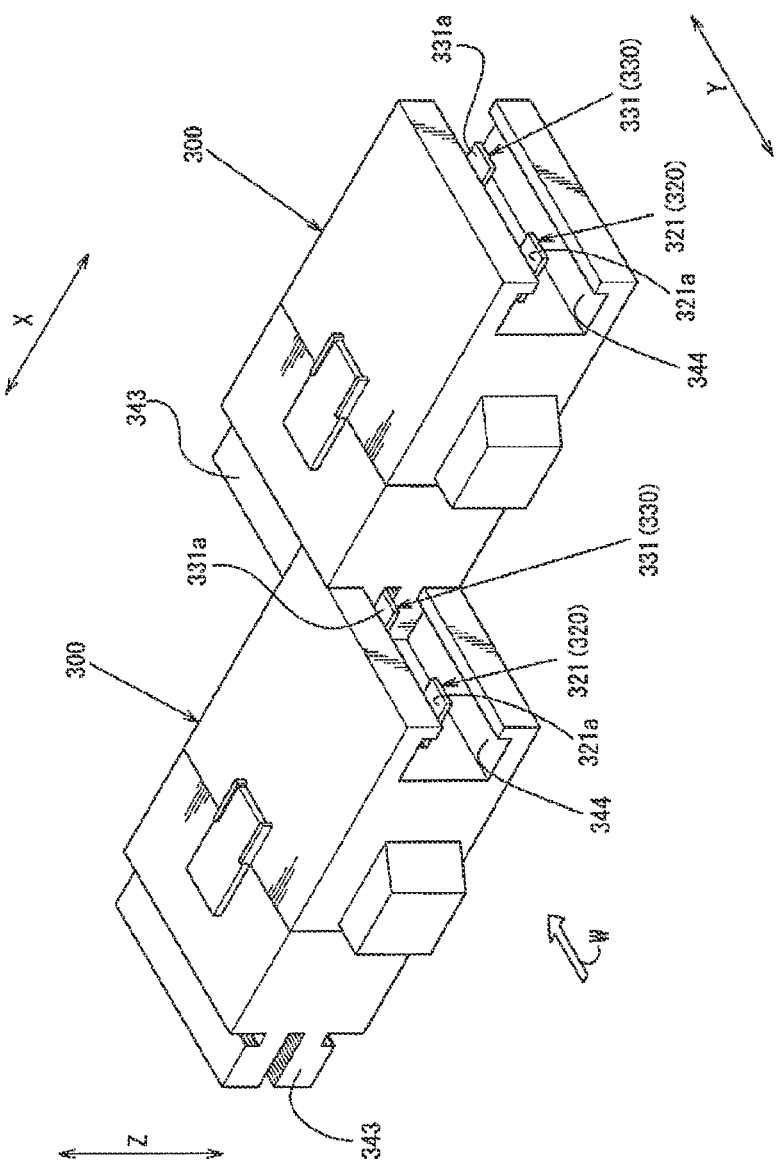
FIG. 18 is an explanatory diagram illustrating a connection process between electrical connection cassettes according to Example 3.

Note that FIG. 17 illustrates an external perspective view of an electrical connection cassette 300 in Example 3, and that FIG. 18 is an explanatory diagram illustrating a connection process between electrical connection cassettes 300. Furthermore, FIG. 17A illustrates an external perspective view of the electrical connection cassette 300 viewed from one side of the X-axis direction, and FIG. 17B illustrates an external perspective view of the electrical connection cassette 300 viewed from the other side in the X-axis direction.

As illustrated in FIG. 17, the electrical connection cassette 300 of Example 3 includes a circuit board (not illustrated), a first set terminal 320 and a second set terminal 330 mounted on the circuit board, a plurality of external connector terminals (not illustrated) mounted on the circuit board, and a substantially rectangular parallelepiped shaped housing 340 that accommodates and holds the circuit board.

The circuit board and the external connector terminals are substantially configured the same as the circuit board 210 and the external connector terminals of above described Example 2, and thus detailed descriptions thereof will be omitted.

The first set terminal 320 and the second set terminal 330 are configured as positive terminals connected to the battery B, and the other set terminals are configured as negative terminals connected to the ground G, similar to Example 2.

As illustrated in FIG. 17, the first set terminal 320 is constituted by one first male connection terminal 321 disposed at an end portion of the circuit board on one side in the X-axis direction, and one first female connection terminal 322 disposed at an end portion of the circuit board on the other side in the X-axis direction. Note that the first male connection terminal 321 and the first female connection terminal 322 are electrically connected via the circuit board.

As illustrated in FIG. 17, the first male connection terminal 321 is formed in a shape having a male connection portion 321a disposed on the other side in the X-axis direction with respect to one end surface 340b of the housing 340, which will be described below. The male connection portion 321a is formed in a substantially flat plate shape having a thickness in the Z-axis direction and having a plane substantially parallel to a main surface of the circuit board.

On the other hand, as illustrated in FIG. 17, the first female connection terminal 322 is formed in a shape having a female connection portion 322a exposed on the other side in the X-axis direction with respect to the other end surface 340a of the housing 340 described below. As illustrated in FIG. 17, the female connection portion 322a is formed in a shape having a thickness in the Y-axis direction and a plane substantially orthogonal to the main surface of the circuit board.

More specifically, the female connection portion 322a of the first female connection terminal 322 is formed in a substantially tuning-fork shape that opens at an interval, which is slightly narrower than the thickness of the male connection portion 321a of the first male connection terminal 321.

Furthermore, similar to Example 2, the first set terminal 320 having the configuration described above is disposed facing in the X-axis direction so that substantially the center of the male connection portion 321a in the Y-axis direction and substantially the center of the female connection portion 322a in the Y-axis direction are positioned on a virtual straight line (not illustrated) along the X-axis direction, and substantially the center of the male connection portion 321a in the Z-axis direction and substantially the center of the female connection portion 322a in the Z-axis direction are disposed on the virtual straight line (not illustrated) along the X-axis direction.

In other words, the male connection portion 321a and the female connection portion 322a of the first set terminal 320 are formed in corresponding shapes that can be concave-convex engaged and connected in the X-axis direction.

As illustrated in FIG. 17, the second set terminal 330 is constituted by one second male connection terminal 331 disposed at an end portion of the circuit board on one side in the X-axis direction, and one second female connection terminal 332 disposed at an end portion of the circuit board on the other side in the X-axis direction. The second male connection terminal 331 and the second female connection terminal 332 are electrically connected via the circuit board.

The second male connection terminal 331 and the second female connection terminal 332 have substantially the same shape as the first male connection terminal 321 and the second female connection terminal 332 in the first set terminal 320, and thus detailed descriptions thereof will be omitted.

Note that in the second male connection terminal 331, a portion corresponding to the male connection portion 321a of the first male connection terminal 321 is referred to as a male connection portion 331a. In the second female connection terminal 332, a portion corresponding to the female connection portion 322a of the first female connection terminal 322 is referred to as a female connection portion 332a.

As illustrated in FIG. 17, the housing 340 is formed in a substantially rectangular parallelepiped shape with an internal hollow shape by assembling an upper case 341 and a lower case 342 in the X-axis direction, similar to Example 2 described above. The housing 340 differs in shapes of engaging convex portion 343 and engaging concave portion 344 relative to the housing 240 in Example 2. Thus, in Example 3, the engaging convex portion 343 and the engaging concave portion 344 of the housing 340 will be described in detail.

As illustrated in FIG. 17, the engaging convex portion 343 is formed protruding toward the other side in the X-axis direction from the other end surface 340a, which is the end surface of the housing 340 on the other side in the X-axis direction. Furthermore, the engaging convex portion 343 integrally accommodates and holds the female connection portion 322a of the first set terminal 320 and the female connection portion 332a of the second set terminal 330.

Specifically, as illustrated in FIG. 17, the engaging convex portion 343 is integrally formed in a substantially T-shape in the Y-axis direction view that is viewed from the Y-direction, with a narrowed portion 343a protruding in the X-axis direction from the other end surface 340a of the housing 340 and a widened portion 343b that extends in the X-axis direction from the narrowed portion 343a Note that the engaging convex portion 343 is formed at a length in the Y-axis direction that is substantially the same as the length of the housing 340 in the Y-axis direction.

The narrowed portion 343a is formed in a substantially rectangular shape in the Y-axis direction having a length in the Z-axis direction that is longer than the length of the female connection portions 322a, 324a in the Z-axis direction.

The widened portion 343b is formed in a substantially rectangular shape in the Y-axis direction having a length in the Z-axis direction that is longer than the length in the Z-axis direction in the narrowed portion 343a and shorter than the length of the housing 340 in the Z-axis direction.

As illustrated in FIG. 17, a slit opening 343c opening into a slit shape is formed with an opening in the engaging convex portion 343 from the other side toward the one side in the X-axis direction substantially at the center in the Z-axis direction.

As illustrated in FIG. 17B, the slit opening 343c is open at a length in the Z-axis direction longer than the thickness of the male connection portions 321a, 331a and a length in the Z-axis direction that is slightly longer than the length in the Z-axis direction in the opening portion of the female connection portions 322a, 332a.

On the other hand, the engaging concave portion 344 is configured to be able to integrally accommodate the male connection portion 321a of the first set terminal 320 and the male connection portion 331a of the second set terminal 330 as illustrated in FIG. 17.

Specifically, as illustrated in FIG. 17, the engaging concave portion 344 is formed in a shape in which an opening corresponding to the narrowed portion 343a of the engaging convex portion 343 and an opening corresponding to the widened portion 343b of the engaging convex portion 343 are recessed from the one end surface 340b which is an end surface of the housing 340 on one side in the X-axis direction, to the other side in the X-axis direction in this order. In other words, the engaging concave portion 344 is formed in a substantially T-shape in the Y-axis direction that convex-concave corresponds in the Y-axis direction with respect to the engaging convex portion 343.

Subsequently, in Example 3 described above, steps of connecting a plurality of electrical connection cassettes 300 in the X-axis direction will be briefly described using FIG. 18.

First, as illustrated in FIG. 18, the electrical connection cassette 300 and another electrical connection cassette 300 are brought into proximity to each other such that the engaging concave portion 344 of another electrical connection cassette 300 overlaps, in the Y-axis direction, the engaging convex portion 343 of the electrical connection cassette 300.

Then, with respect to the engaging convex portion 343 of the electrical connection cassette 300, the engaging concave portion 344 of another electrical connection cassette 300 is concave-convex engaged along the direction from one side to the other in the Y-axis direction (direction of arrow W in FIG. 18). Thereafter, another electrical connection cassette 3M) is concave-convex engaged along the Y-axis direction until a plane facing the Y-axis direction of the electrical connection cassette 300 and a plane facing the Y-axis direction of another electrical connection cassette 300 are positioned at substantially the same position in the Y-axis direction.

At this time, with the concave-convex engagement between the housings 340 along the Y-axis direction, the female connection portion 322a of the first set terminal 320 in another electrical connection cassette 300 is engaged and connected along the Y-axis direction in the male connection portion 321a of the first set terminal 320. Similarly, the female connection portion 332a of the second set terminal 330 in another electrical connection cassette 300 is engaged and connected to the male connection portion 331a of the second set terminal 330 along the Y-axis direction. In this way, the connecting between the electrical connection cassettes 300 in the X-axis direction is completed.

As described above, the electrical connection cassette 30) of Example 3 is configured so that the electrical connection cassettes 200 can engage together in the Y-axis direction, which is a direction substantially parallel to one main surface of the circuit board, and a direction substantially parallel to the one end surface 340b and the other end face 340a of the housing 340, as the engaging direction of the housing 340.

In addition, the electrical connection cassette 300 is configured so as to be able to electrically connect the electrical connection cassettes 300 to each other in the Y-axis direction, which is a direction substantially parallel to the plane of the male connection portion 321a in the first set terminal 320 and the plane of the male connection portion 231a in the second set terminal 330, and a direction substantially orthogonal to the plane of the female connection portion 322a in the first set terminal 320, and the plane of the female connection portion 332a of the second set terminal 330, as a terminal connection direction.

According to the electrical connection cassette 300 according to the present embodiment, the circuit board, a first male connection terminal 321 and a first female connection terminal 322 disposed opposite to each other in the X-axis direction, which is a direction parallel to the main surface of the circuit board, and mounted on the circuit board, and a substantially rectangular parallelepiped shaped housing 340 that accommodates and holds the circuit board are provided. The housing 340 includes an engaging convex portion 343 formed in a convex shape and an engaging concave portion 344 formed in a concave shape, both being formed in a concave-convex shape and formed so as to face each other in the X-axis direction and corresponding to each other. The first male connection terminal 321 and the first female connection terminal 322 are formed in corresponding shapes that can be engaged to each other along the Y-axis direction, and configured to be electrically conductive in a state where the housing 340 and another housing 340 adjacent in the X-axis direction are concave-convex engaged along the Y-axis direction.

According to this configuration, the electrical connection cassette 300 can achieve the same effects as Example 1 described above.

Specifically, the electrical connection cassette 300 can be connected to another electrical connection cassette 300 along the X-axis direction, and therefore, the device can be freely expanded and added with functions in accordance with the size of the free space.

Example 4

Next, Example 4, in which the connecting direction of an electrical connection cassettes 400 is different from that in Examples 1 to 3 described above, will be described with reference to FIGS. 19 to 21.

Figure 19:
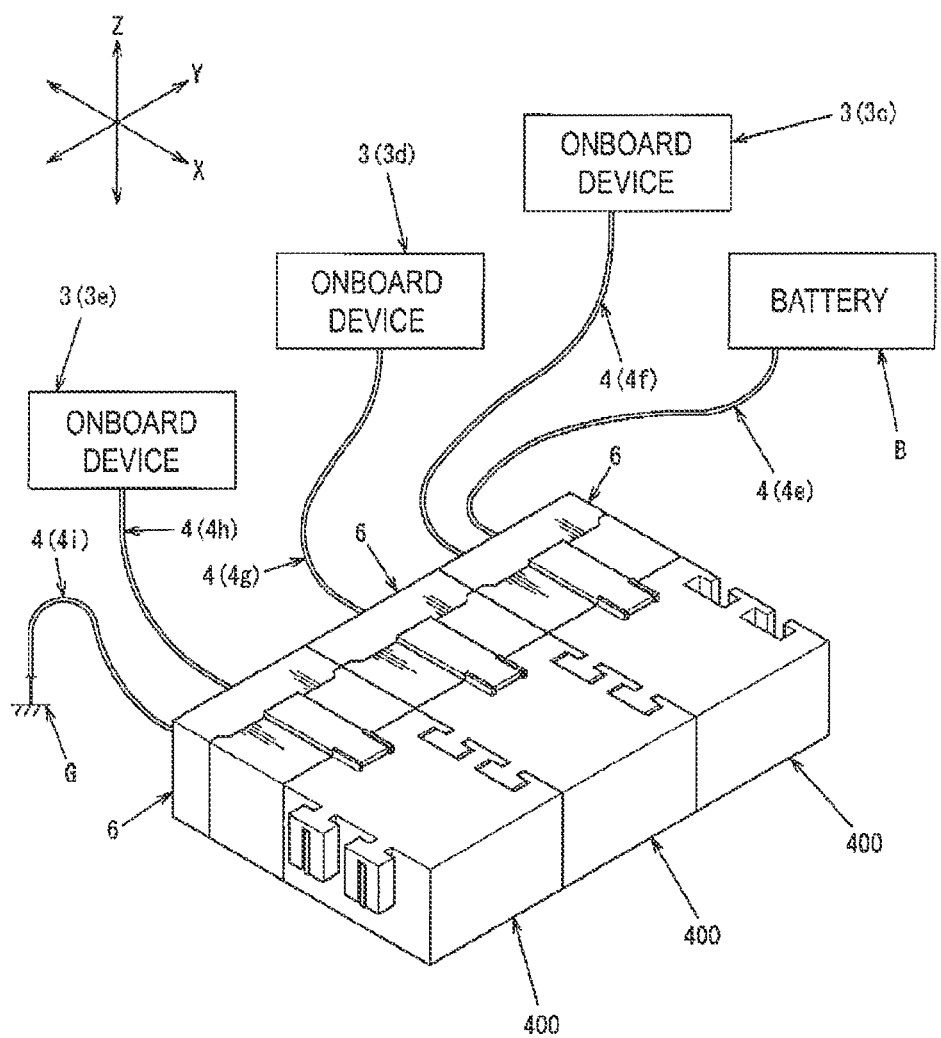
FIG. 19 is an explanatory diagram illustrating an example of use of an electrical connection cassette according to Example 4.
Figure 20A:
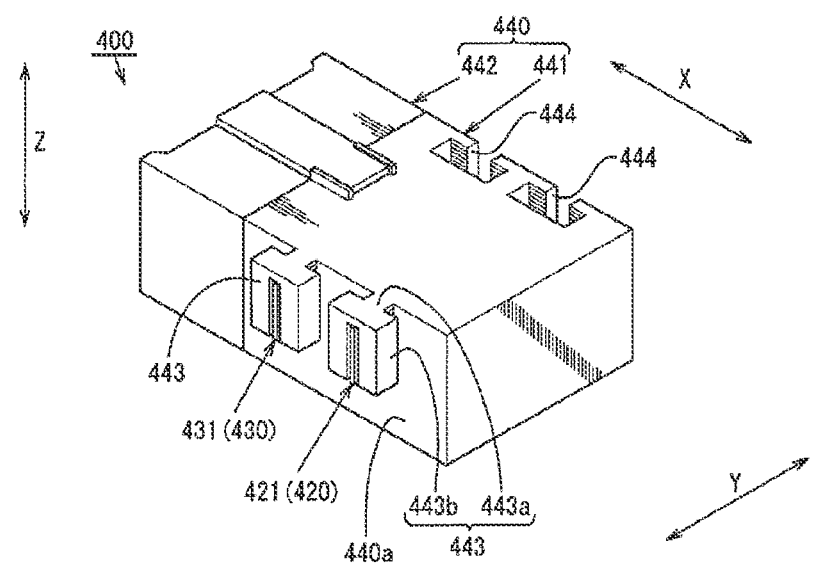
FIGS. 20A-20B are an external perspective view illustrating an appearance of the electrical connection cassette according to Example 4.
Figure 20B:
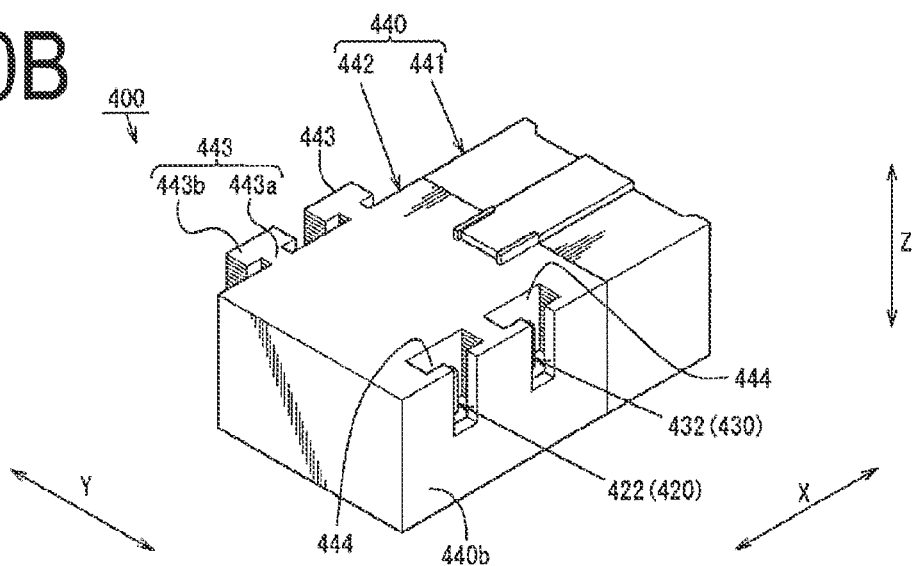
Figure 21:
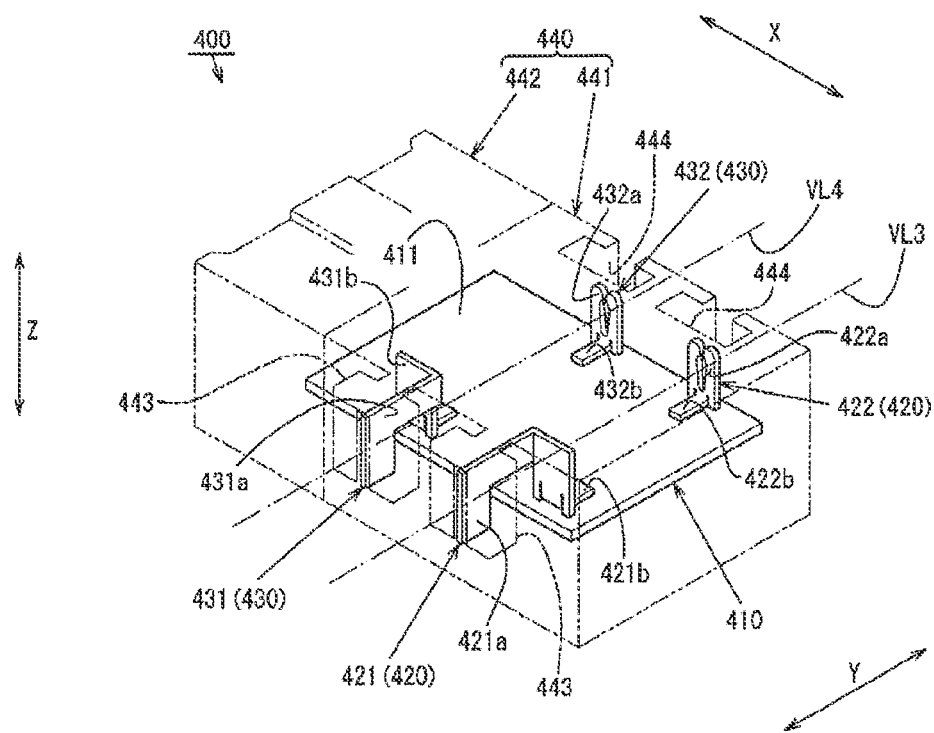
FIG. 21 is an external perspective view illustrating an appearance of an internal configuration of the electrical connection cassette according to Example 4.

Note that FIG. 19 is an explanatory diagram illustrating an example of use of the electrical connection cassette 400 in Example 4, FIG. 20 illustrates an external perspective view of the electrical connection cassette 400, and FIG. 21 illustrates an external perspective view of the internal configuration of the electrical connection cassette 400.

FIG. 20A illustrates an external perspective view of the electrical connection cassette 400 viewed from one side of the Y-axis direction, and FIG. 20B illustrates an external perspective view of the electrical connection cassette 400 viewed from the other side in the Y-axis direction.

The left side in the drawing in the Y-axis direction is one side of the Y-axis direction, and the right side in the drawing in the Y-axis direction is the other side of the Y-axis direction.

The same components as those in Example 2 described above are denoted by the same reference signs, and detailed descriptions thereof will be omitted.

As illustrated in FIG. 19, the electrical connection cassette 400 of Example 4 is configured to be capable of connecting electrical connection cassettes 400 of the same configuration in the Y-axis direction. Then, for example, as illustrated in FIG. 19, the three electrical connection cassettes 400 connected in the Y-axis direction are connected to the battery B, the onboard device 3 (3c, 3d, 3e), and the ground G in the same manner as in Example 2 described above.

As illustrated in FIG. 20 and FIG. 21, the electrical connection cassette 400 includes a circuit board 410, a first set terminal 420 and a second set terminal 430 mounted on the circuit board 410, a plurality of external connector terminals (not illustrated) mounted on the circuit board 410, and a substantially rectangular parallelepiped shaped housing 440 that accommodates and holds the circuit board 410. Note that the circuit board 410 has a configuration similar to that of the Example 2 described above, and thus detailed descriptions thereof will be omitted.

The first and second set terminals 420 and 430 are mounted on one main surface 411 of the circuit board 410 at predetermined intervals in the X-axis direction, as illustrated in FIG. 21.

One of the first set terminal 420 and second set terminal 430 is configured as a positive terminal connected to the battery B via the power feeder line 4 (4e) and the other set terminal is configured as a negative terminal connected to the ground G via the power feeder line 4 (4i), similar to Example 2 described above.

As illustrated in FIG. 21, the first set terminal 420 includes a first male connection terminal 421 disposed at an end portion of the circuit board 410 on one side in the Y-axis direction (the left side in FIG. 21), and one first female connection terminal 422 disposed at the end of the circuit board 410 on the other side in the Y-axis direction (the right side in FIG. 21). Note that the first male connection terminal 421 and the first female connection terminal 422 are electrically connected via the circuit board 410.

As illustrated in FIG. 21, the first male connection terminal 421 is integrally formed with a male connection portion 421a that extends in the Z-axis direction and a terminal base portion 421b that electrically connects the male connection portion 421a and the circuit board 210. The male connection portion 421a of the first male connection terminal 421 is formed in a substantially flat plate shape having a thickness in the X-axis direction and having a plane substantially orthogonal to a main surface of the circuit board 410. Note that the male connection portion 421a of the first male connection terminal 421 is disposed exposed on one side in the Y-axis direction with respect to the one end surface 440a of the housing 440, which will be described below.

As illustrated in FIG. 21, the first female connection terminal 422 is integrally formed with a female connection portion 422a having a tip portion disposed inside the housing 440 and a terminal base portion 422b that electrically connects the female connection portion 422a and the circuit board 410. The female connection portion 422a of the first female connection terminal 422 is formed in a shape having a thickness in the Y-axis direction and a plane substantially orthogonal to the main surface of the circuit board 410.

More specifically, the female connection portion 422a of the first female connection terminal 422 is formed in a substantially tuning-fork shape that opens at an interval, which is slightly narrower than the thickness of the male connection portion 421a of the first male connection terminal 421.

As illustrated in FIG. 21, the first set terminal 420 having the configuration described above is disposed facing in the Y-axis direction so that substantially the center of the male connection portion 421a in the X-axis direction and substantially the center of the female connection portion 422a in the X-axis direction are positioned on a virtual line VL3 along the Y-axis direction, and substantially the center of the male connection portion 421a in the Z-axis direction and substantially the center of the female connection portion 422a in the Z-axis direction are positioned on the virtual straight line VL3 along the Y-axis direction.

In other words, in the Z-axis direction viewed from the Z-axis direction, the first set terminal 420 is configured such that the male connection portion 421a and the female connection portion 422a are disposed so as to face each other on the virtual straight line VL3 along the Y-axis direction.

More particularly, the first set terminal 420 is configured so that the first male connection terminal 421 and the first female connection terminal 422 are disposed opposite each other, with a contact portion of the male connection portion 421a that is the contact point with the female connection portion 422a of an adjacent electrical connection cassette 400, and a contact portion of the female connection portion 422a that is the contact point with the male connection portion 421a of adjacent another electrical connection cassette 400 being positioned on the virtual straight line VL3.

In other words, the male connection portion 421a and the female connection portion 422a of the first set terminal 420 are formed in corresponding shapes that can be concave-convex engaged and connected in the Z-axis direction.

As illustrated in FIG. 21, the second set terminal 430 is constituted by a second male connection terminal 431 disposed at an end portion of the circuit board 410 on one side in the Y-axis direction (the left side in FIG. 21), and one second female connection terminal 432 disposed at an end portion of the circuit board 410 on the other side in the Y-axis direction (the right side in FIG. 21). Note that the second male connection terminal 431 and the second female connection terminal 432 are electrically connected via the circuit board 410.

As illustrated in FIG. 21, the second male connection terminal 431 is integrally formed with the male connection portion 431a and the terminal base portion 431b. Note that the second male connection terminal 431 is formed so as to be axisymmetric with respect to the first male connection terminal 421 with the Z-axis direction as the axis of symmetry, and thus detailed descriptions thereof will be omitted.

As illustrated in FIG. 21, the second female connection terminal 432 is integrally formed with the female connection portion 432a and the terminal base portion 432b. Note that the second female connection terminal 432 has substantially the same shape as the first female connection terminal 422, and thus detailed description thereof will be omitted.

As illustrated in FIG. 21, the second set terminal 430 having the configuration described above is disposed facing in the Y-axis direction so that substantially the center of the male connection portion 431a in the X-axis direction and substantially the center of the female connection portion 432a in the X-axis direction are positioned on a virtual line VL4 along the Y-axis direction, and substantially the center of the male connection portion 431a in the Z-axis direction and substantially the center of the female connection portion 432a in the Z-axis direction are positioned on the virtual straight line VL4 along the Y-axis direction.

In other words, in the Z-axis direction view that is viewed from the Z-axis direction, the second set terminal 430 is configured so that the male connection portion 431a and the female connection portion 432a are disposed so as to face each other on the virtual straight line VL4 along the Y-axis direction.

More particularly, the second set terminal 430 is configured so that the second male connection terminal 431 and the second female connection terminal 432 are disposed opposite each other, with a contact portion of the male connection portion 431a that is the contact point with the female connection portion 432a of an adjacent electrical connection cassette 400, and a contact portion of the female connection portion 432a that is the contact point with the male connection portion 431a of adjacent another electrical connection cassette 400 being positioned on the virtual straight line VL4.

In other words, the male connection portion 431a and the female connection portion 432a of the second set terminal 430 are formed in corresponding shapes that can be concave-convex engaged and connected in the Z-axis direction.

As illustrated in FIGS. 20 and 21, the housing 440 is formed in a substantially rectangular parallelepiped shape with an internal hollow shape by assembling an upper case 441 and a lower case 442 in the X-axis direction, similar to Example 2 described above.

As illustrated in FIG. 20, in the housing 440 according to Example 4, a pair of engaging convex portions 443 and a pair of engaging concave portions 444 are formed on opposing end surfaces in the Y-axis direction.

The pair of engaging convex portions 443 and the engaging concave portions 444 are formed in shapes corresponding to the engaging convex portions 172 and the engaging concave portions 173 provided on the planes of the housing 16 facing in the Z-axis direction, in Example 1 described above. Therefore, the pair of engaging convex portions 443 and the pair of engaging concave portions 444 are briefly described in Example 4.

As illustrated in FIG. 20, the pair of engaging convex portions 443 are provided protruding toward one side in the Y-axis direction on one end surface 440a, which is an end surface of the housing 440 on one side in the Y-axis direction. The pair of engaging convex portions 443 are configured such that the male connection portion 421a of the first set terminal 420 exposed from one end surface 440a and the male connection portion 431a of the second set terminal 430 can be accommodated independently.

Specifically, as illustrated in FIG. 20, the engaging convex portion 443 is integrally formed in a substantially T-shape in the Z-axis direction viewed from the Z-axis direction, with a narrowed portion 443a protruding in the Y-axis direction from the one end surface 440a of the housing 440 and a widened portion 443b that extends in the Y-axis direction from the narrowed portion 443a. Note that the engaging convex portion 443 is formed at a length in the Z-axis direction that is approximately half the length of the housing 440 in the Z-axis direction.

The narrowed portion 443a is formed in a substantially rectangular shape in the Z-axis direction having a length in the X-axis direction that is longer than the thickness of the male connection portion 421a. 431a.

The widened portion 443b is formed so as to be a substantially rectangular shape viewed in the Z-axis direction having a length in the X-axis direction longer than the length of the narrowed portion 443a in the X-axis direction and longer than the length of the female connection portion 422a, 432a in the X-axis direction. When the electrical connection cassettes 400 are connected to each other, the widened portion 443b is formed into a shape having an internal space capable of accommodating the female connection portion 422a, 432a of an adjacent electrical connection cassette 400.

On the other hand, as illustrated in FIG. 20, the pair of engaging concave portions 444 are formed at positions that face each other in the Y-axis direction with respect to the pair of engaging convex portions 443. The pair of engaging concave portions 444 are configured such that the female connection portion 422a of the first set terminal 420 and the female connection portion 432a of the second set terminal 430 can be independently accommodated, respectively.

Specifically, as illustrated in FIG. 20, the engaging concave portion 444 is formed in a shape in which an opening corresponding to the narrowed portion 443a of the engaging convex portion 443 and an opening corresponding to the widened portion 443b of the engaging convex portion 443 are recessed from the other end surface 440b which is the end surface of the housing 440 on the other side in the Y-axis direction, to the one side in Y-axis direction in this order. Specifically, the engaging concave portion 444 is formed in a substantially T-shape viewed in the Z-axis direction that convex-concave corresponds in the Z-axis direction with respect to the engaging convex portion 443.

Subsequently, steps of connecting the plurality of electrical connection cassettes 400 in the Y-axis direction in Example 4 will be briefly described.

First, the engaging convex portion 443 of another electrical connection cassette 400 is convex-concave engaged with the engaging concave portion 444 of the electrical connection cassette 400 along a direction from one side in the Z-axis direction (the upper side in FIG. 20) toward the other (the lower side in FIG. 20). Thereafter, another electrical connection cassette 400 is concave-convex engaged along the Z-axis direction until a plane facing the Z-axis direction of the electrical connection cassette 400 and a plane facing the Z-axis direction of another electrical connection cassette 400 are positioned at substantially the same position in the Z-axis direction.

At this time, as a result of the concave-convex engagement between the housings 440 along the Z-axis direction, the male connection portion 421a of the first set terminal 420 in another electrical connection cassette 400 is engaged and connected, along the Z-axis direction, to the female connection portion 422a of the first set terminal 420. Similarly, the male connection portion 431a of the second set terminal 430 in another electrical connection cassette 400 is engaged and connected, along the Z-axis direction, to the female connection portion 432a of the second set terminal 430. In this way, the connecting between the electrical connection cassettes 400 in the Y-axis direction is completed.

As described above, the electrical connection cassette 400 of Example 4 is configured so as to be capable of engaging the electrical connection cassettes 400 together in the Z-axis direction, which is a direction substantially orthogonal to one main surface 411 (see FIG. 21) of the circuit board 410, and a direction substantially parallel to the one end surface 440a and the other end surface 440b of the housing 440, as the engaging direction of the housing 440.

In addition, the electrical connection cassette 400 is configured so as to be able to electrically connect the electrical connection cassettes 400 each other in the Z-axis direction, which is a direction substantially parallel to the plane of the male connection portion 421a in the first set terminal 420 and the plane of the male connection portion 431a in the second set terminal 430, and a direction substantially parallel to the plane of the female connection portion 422a in the first set terminal 420, and the plane of the female connection portion 432a of the second set terminal 430, as a terminal connection direction.

According to the electrical connection cassette 400 according to the present embodiment, the circuit board 410, a first male connection terminal 421 and a first female connection terminal 422 disposed opposite to each other in the Y-axis direction, which is a direction parallel to the main surface of the circuit board 410, and mounted on the circuit board 410, and a substantially rectangular parallelepiped shaped housing 440 that accommodates and holds the circuit board 410 are provided. The housing 440 includes an engaging convex portion 443 formed in a convex shape and an engaging concave portion 444 formed in a concave shape, both being formed in a concave-convex shape and formed so as to face each other in the Y-axis direction and corresponding to each other. The first male connection terminal 421 and the first female connection terminal 422 are formed in corresponding shapes that can be engaged to each other along the Z-axis direction, and configured to be electrically conductive in a state where the housing 440 and another housing 440 adjacent in the Y-axis direction are concave-convex engaged along the Z-axis direction.

According to this configuration, the electrical connection cassette 400 can achieve the same effects as Example 1 described above.

Specifically, each electrical connection cassette 400 can connect to another electrical connection cassette 400 along the Y-axis direction, and therefore, the device can be freely expanded and added with functions in accordance with the size of the free space.

Note that in Examples 2, 3, and 4 described above, the external connector 6 is connected to the housing 240, 440 from the other side in the X-axis direction, but the disclosure is not limited thereto, and an opening portion may be provided in the housing 240, 440 as a connector connection portion to which the external connector 6 is connected from an in-plane direction which is a direction substantially parallel to the main face 211, 411 of the circuit board 210, 410. Alternatively, the power feeder line 4 electrically connected to the main surface 211, 411 of the circuit board 210, 440 may be configured to be guided out from the surface of the housing 210, 410 facing in the in-plane direction. Note that in this case, the in-plane direction is a direction orthogonal to the connecting direction of the electrical connection cassette.

For example, as in Examples 2 and 3, when the electrical connection cassette 200 is connected along the X-axis direction, the external connector 6 may be connected from the Y-axis direction to an opening portion formed opening in the housing along the Y-axis direction orthogonal to the X-axis direction, as a connector connection portion. Alternatively, the power feeder line 4 may be configured to directly derive from a surface of the housing facing in the Y-axis direction toward the Y-axis direction.

With the configuration described above, the external connector and the power feeder line can be prevented from being exposed in the Z-axis direction from an end surface of the electrical connection cassette in the Z-axis direction. Thus, in a state in which the electrical connection cassettes are connected in the X-axis direction or the Y-axis direction, the electrical connection cassette can reliably suppress a length in the Z-axis direction, which is a direction substantially perpendicular to the main surface 211 of the circuit board 210.

Furthermore, in Examples 2, 3, and 4 described above, the first set terminal 220, 320, 420 and the second set terminal 230, 330, 430 having the substantially flat shaped male connection portion and the substantially tuning-fork shaped female connection portion are described above, but the disclosure is not limited thereto, and corresponding shapes that can be engaged with each other may be used as a male connection portion and a female connection portion having an appropriate shape. For example, the disclosure may use a set terminal having a substantially cylindrical male connection portion and a substantially cylindrical female connection portion such as a bullet terminal, a set terminal having a substantially tuning-fork shaped male connection portion and female connection portion having corresponding shapes that can engage with each other, or a set terminal having a male connection portion and female connection portion such as a flat terminal.

One set terminal is constituted by a male connection terminal and a female connection terminal configured as a separate body, but the disclosure is not limited thereto, and a connection terminal in which the male connection terminal and the female connection terminal are integrated may be used as the set terminal. In this case, a portion corresponding to the male connection portion is referred to as a male connection terminal, and a portion corresponding to the female connection portion is referred to as a female connection terminal.

An electrical connection cassette 200, 300, 400 provided with two set terminals (first set terminal 220, 320, 420 and second set terminal 230, 330, 430) is described, but the disclosure is not limited thereto, and may be an electrical connection cassette including one set terminal or three or more set terminals.

In Example 2 described above, the electrical connection cassette 200 having the male connection portion 221a of the first set terminal 220 and the male connection portion 231a of the second set terminal 230 exposed from the housing 240 are described, but the disclosure is not limited thereto, and may be an electrical connection cassette having surrounding portions surrounding the exposed male connection portion 221a and the male connection portion 231a respectively, integrally formed with the housing. In this case, the surrounding portion is formed in a shape with an internal space capable of accommodating the female connection portion 222a of the first set terminal 220 and the female connection portion 232a of the second set terminal 230. Furthermore, the opening portions 246a and 246b on the other end surface 246 of the housing 240 open in a shape that convex-concave corresponds to the surrounding portion.

The shape of the engaging convex portion 245 and the shape of the engaging concave portion 248 in Example 2, as well as the shape of the male connection portion 221a, 231a and the shape of the female connection portion 222a, 232a are not limited to the shapes described above, but shapes may be appropriate shapes as long as the engaging convex portion and the engaging concave portion are concave-convex shapes that correspond to each other and the male and female connection portions have corresponding shapes that can be engaged with each other.

Figure 22A:
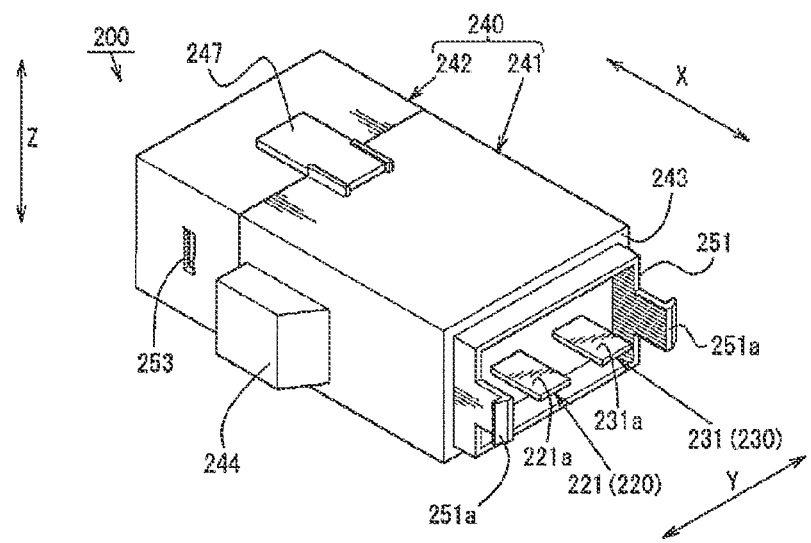
FIGS. 22A-22B are an external perspective view illustrating an appearance of an electrical connection cassette according to another embodiment.
Figure 22B:
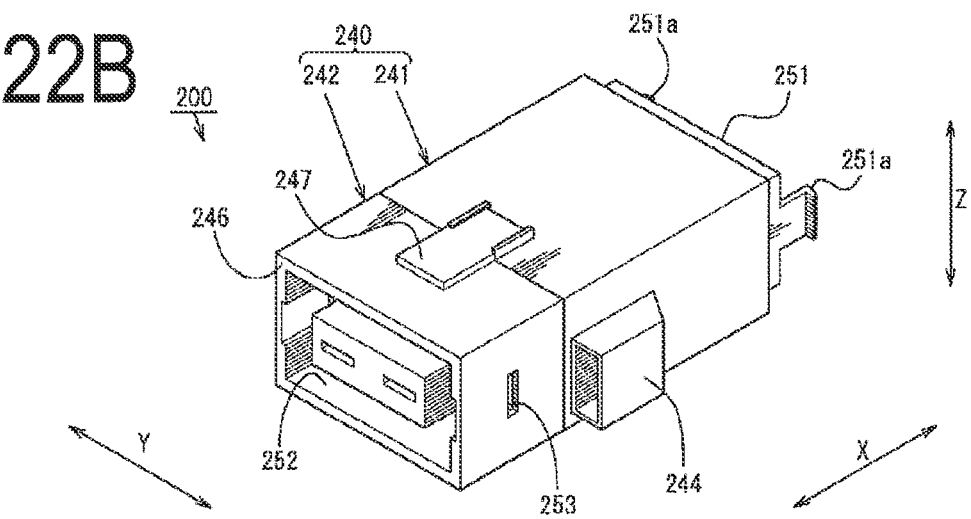

For example, as illustrated in FIG. 22, which illustrates an external perspective view of an electrical connection cassette 200 according to another embodiment, the electrical connection cassette 200 may be configured such that the engaging convex portion 251 having a substantially annular wall shape as viewed in the X-axis direction and the engaging concave portion 252 recessed in a shape that is concave-convex facing the engaging convex portion 251 are formed opposite an end surface of the housing 240 facing in the X-axis direction.

Specifically, as illustrated in FIG. 22, the substantially annular shaped engaging convex portion 251 has an outer circumferential surface that is smaller than the outer periphery of the one end surface 243 of the housing 240 and an inner peripheral surface that integrally surrounds the male connection portion 221a of the first set terminal 220 and the male connection portion 231a of the second set terminal 230, and the substantially annular shaped engaging convex portion 251 extends from the one end surface 243 to one side in the X-axis direction. Furthermore, the engaging convex portion 251 is integrally formed with the engaging claw portion 251a that faces in the Y-axis direction.

On the other hand, as illustrated in FIG. 22, the engaging concave portion 252 is formed in a shape that is recessed toward one side in the X-axis direction with a size substantially equal to the outer peripheral shape of the engaging convex portion 251, except for a portion for integrally accommodating the female connection portion 222a of the first set terminal 220 and the female connection portion 232a of the second set terminal 230. Furthermore, an engaging hole 253 having a corresponding shape with which the engaging claw portion 251a of the engaging convex portion 251 can engage is formed with an opening on a surface of the housing 240 that faces in the Y-axis direction.

Even with such a configuration, the electrical connection cassette 200 can be connected to another electrical connection cassette 200 in the X-axis direction, similar to Example 2 described above. Thus, the electrical connection cassette 200 can achieve similar effects as the embodiment described above.

The shape of the engaging convex portion 343 and the shape of the engaging concave portion 344 in Example 3, as well as the shape of the male connection portion 321a, 331a and the shape of the female connection portion 322a. 332a are not limited to the shapes described above, but shapes may be appropriate shapes as long as the engaging convex portion and the engaging concave portion are concave-convex shapes that correspond to each other and the male and female connection portions have corresponding shapes that can be engaged with each other.

For example, the electrical connection cassette may be configured such that the engaging convex portion may be formed in a shape capable of accommodating the male connection portion, the engaging concave portion may be formed in a shape capable of accommodating the female connection portion, and the engaging convex portion and the engaging concave portion may be formed in a convex-concave corresponding shape.

Figure 23A:
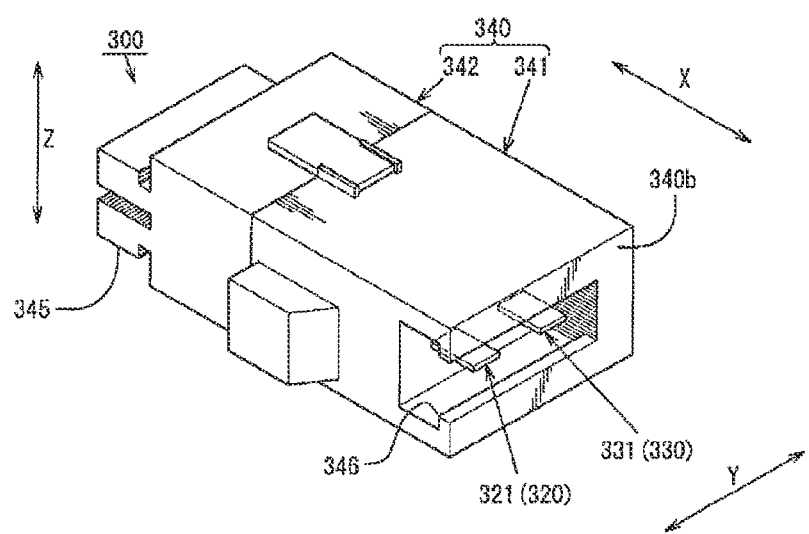
FIGS. 23A-23B are an external perspective view illustrating an appearance of an electrical connection cassette according to still another embodiment.
Figure 23B:
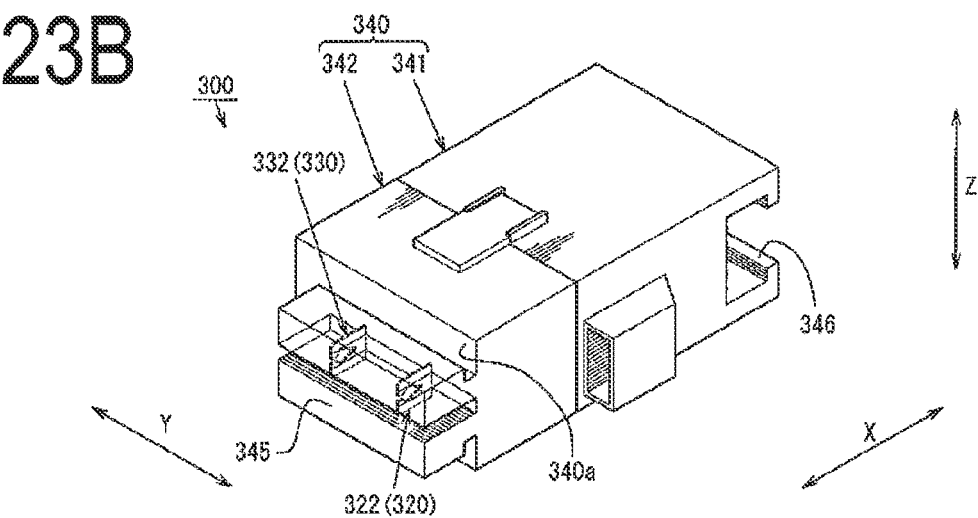

Alternatively, as illustrated in FIG. 23, which illustrates an external perspective view of the electrical connection cassette 300 according another embodiment, the electrical connection cassette 300 may be configured such that the engaging convex portion 345 and the engaging concave portion 346 having a length in the Y-axis direction that is shorter than the length in the Y-axis direction of the housing 340 are formed on the housing 340 facing in an X-axis direction. In this case, the engaging convex portion 345 of another electrical connection cassette 300 can be engaged and connected to the engaging concave portion 346 of the electrical connection cassette 300 only from one side of the Y-axis direction (the left side in FIG. 23). Even with such a configuration, the electrical connection cassette 300 can be connected to another electrical connection cassette 300 in the X-axis direction. Thus, the electrical connection cassette 300 can have the same effects as the examples described above.

Figure 24A:
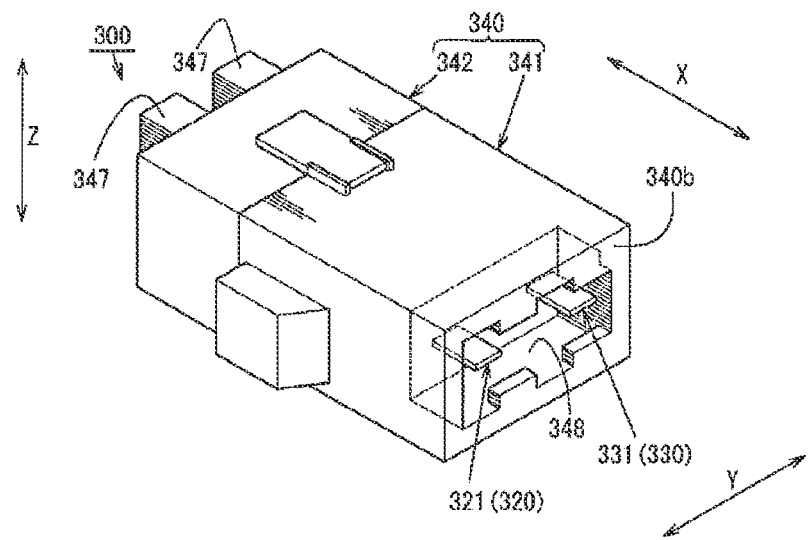
FIGS. 24A-24B are an external perspective view illustrating an appearance of an electrical connection cassette according to yet another embodiment.
Figure 24B:
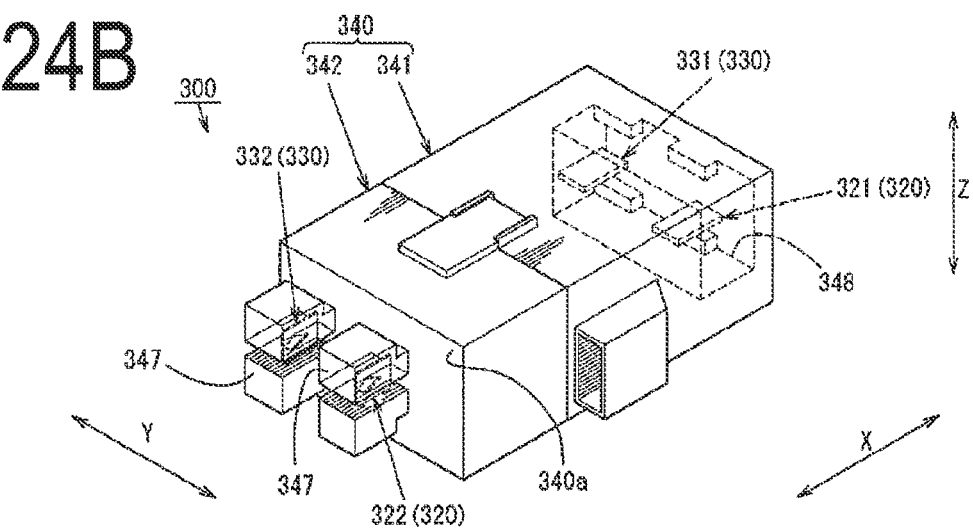

Alternatively, as illustrated in FIG. 24, which illustrates an external perspective view of an electrical connection cassette 300 according another embodiment, the electrical connection cassette 300 may be configured such that the pair of engaging convex portions 347 that independently accommodate the female connection portion 322a of the first set terminal 320 and the female connection portion 332a of the second set terminal 330, respectively, are formed on the housing 240.

In this case, the engaging concave portion 348 of the housing 340 is formed so that, as illustrated in FIG. 24, a portion having an opening edge having a size corresponding to the widened portion of the engaging convex portion 347 and a portion having an opening edge having a size corresponding to the narrowed portion of the engaging convex portion 347 are formed in two continuous shapes in this order from one side in the Y-axis direction (the left side in FIG. 24). Furthermore, the engaging concave portion 348 of the housing 340 accommodates the male connection portion 321a of the first set terminal 320 and the male connection portion 331a of the second set terminal 330 in a portion having an opening edge having a size corresponding to the narrowed portion of the engaging convex portion 347.

Figure 25A:
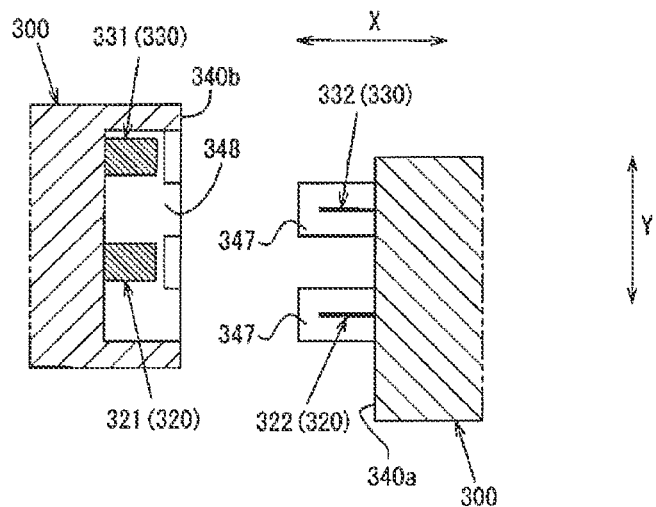
FIGS. 25A-25B are an explanatory diagram illustrating a connection process between the electrical connection cassettes of FIG. 24.
Figure 25B:
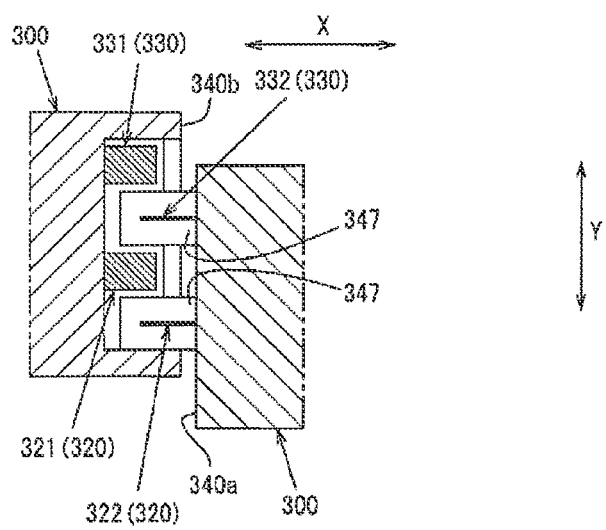

With such a configuration, when connecting the electrical connection cassettes 300 together, as illustrated in FIG. 25A, which illustrates an explanatory diagram illustrating the connection process between the electrical connection cassettes 300 in FIG. 24, the engaging convex portion 347 of another electrical connection cassette 300 is disposed facing in the X-axis direction with a portion having an opening edge having a size corresponding to the widened portion of the engaging convex portion 347. Thereafter, as illustrated in FIG. 25B, the engaging convex portion 347 of another electrical connection cassette 300 can be inserted into the engaging concave portion 348 along the X-axis direction, and then relatively moved in the Y-axis direction to be engaged and connected.

Even with such a configuration, the electrical connection cassette 300 can be connected to another electrical connection cassette 300 in the X-axis direction. Thus, the electrical connection cassette 300 can have the same effects as the examples described above.

The configuration of connecting the electrical connection cassettes in the X-axis direction is described using the electrical connection cassette 200 of Example 2 that can be engaged and connected along the X-axis direction, and the electrical connection cassette 300 of Example 3 that can be engaged along the Y-axis direction, but the disclosure is not limited thereto, and the electrical connection cassettes may be configured to engage together along the Z-axis direction to connect the electrical connection cassettes in the X-axis direction.

For example, the electrical connection cassette may be configured such that in place of the first and second set terminals 320, 330 of Example 3, the first and second set terminals 420, 430 of Example 4 are mounted to the circuit board at predetermined intervals in the Y-axis direction, and in place of the engaging convex portion 343 and the engaging concave portion 344 of Example 3, the engaging convex portion 443 and the engaging concave portion 444 of Example 4 are formed on an end surface of the housing 340 facing in the X-axis direction.

Even with such a configuration, the electrical connection cassette can be connected to another electrical connection cassette in the X-axis direction, similar to Example 3 described above. Thus, the electrical connection cassette can have the same effects as the examples described above.

The shape of the engaging convex portion 443 and the shape of the engaging concave portion 444 in Example 4, as well as the shape of the male connection portion 421a, 431a and the shape of the female connection portion 422a. 432a are not limited to the shapes described above, but shapes may be appropriate shapes as long as the engaging convex portion and the engaging concave portion are concave-convex shapes that correspond to each other and the male and female connection portions have corresponding shapes that can be engaged with each other.

For example, the electrical connection cassette may be configured such that the engaging convex portion may be formed in a shape capable of accommodating the female connection portion, the engaging concave portion may be formed in a shape capable of accommodating the male connection portion, and the engaging convex portion and the engaging concave portion may be formed in a convex-concave corresponding shape.

Alternatively, the electrical connection cassette may be configured such that in place of the first and second set terminals 420, 430 of Example 4, the first and second set terminals 220, 230 of Example 2 are mounted to the circuit board 410 at predetermined intervals in the X-axis direction, and in place of the engaging convex portion 443 and the engaging concave portion 444 of Example 4, the engaging convex portion 245 and the engaging concave portion 248 of Example 2 are formed on an end surface of the housing 440 facing in the X-axis direction.

Alternatively, the electrical connection cassette may be configured such that in place of the first and second set terminals 420, 430 of Example 4, the first and second set terminals 320, 330 of Example 3 are mounted to the circuit board at predetermined intervals in the X-axis direction, and in place of the engaging convex portion 443 and the engaging concave portion 444 of Example 4, the engaging convex portion 343 and the engaging concave portion 344 of Example 3 are formed on an end surface of the housing 440 facing in the Y-axis direction.

Even with such a configuration, the electrical connection cassette can be connected to another electrical connection cassette in the Y-axis direction, similar to Example 4 described above. Thus, the electrical connection cassette can have the same effects as the examples described above.

In Example 4, the electrical connection cassette 400 is configured such that the pair of engaging convex portions 443 independently accommodate the male connection portion 421a of the first set terminal 420 and the male connection portion 431a of the second set terminal 430, respectively, and the pair of engaging concave portions 444 independently accommodate the female connection portion 422a of the first set terminal 420 and the female connection portion 432a of the second set terminal 430, respectively, but the disclosure is not limited to thereto, and the electrical connection cassette 400 may be provided with one engaging convex portion that integrally accommodates the male connection portion 421a of the first set terminal 420 and the male connection portion 431a of second set terminal 430, and one engaging concave portion that integrally accommodates both the female connection portion 422a of the first set terminal 420 and the female connection portion 432a of the second set terminal 430.

However, the disclosure is not intended to be limited to the configurations in the aforementioned embodiment and variations, but combinations of above-mentioned embodiment and variations may be included and many other embodiments can also be employed.

REFERENCE SIGNS LIST 1, 1A to 1E Electrical connection cassette
10 Circuit board
10a Side portion of both sides of circuit board
10b Cutout portion
11, 12 Metal member
16 Housing
111, 121 First connection terminal
112, 122 Second connection terminal
113, 123 Connecting portion
114, 124 Clamping portion
114c, 124c Clamping portion (electrical connection portion)
172 Engaging convex portion
172a First widened portion
172b First narrowed portion
172c Accommodating concave portion
173 Engaging concave portion
173c Second widened portion
173d Second narrowed portion
200, 300, 400 Electrical connection cassette
210, 410 Circuit board
211, 411 Main surface
220, 320, 420 First set terminal
221, 321, 421 First male connection terminal
222, 322, 422 First female connection terminal
230, 330, 430 Second set terminal
231, 331, 431 Second male connection terminal
232, 332, 432 Second female connection terminal
240, 340, 440 Housing
245, 251, 343, 345, 347, 443 Engaging convex portion
248, 252, 344, 346, 348, 444 Engaging concave portion
B Battery
G Ground
P1 Position of first connection terminal
P2 Position of second connection terminal
VL1, VL2, VL3, VL4 Virtual straight line

The invention claimed is:

1. An electrical connection cassette comprising:
a circuit board;
a first connection terminal and a second connection terminal mounted on the circuit board and disposed facing each other in an in-plane direction which is a direction parallel to a main surface of the circuit board; and
a housing having a rectangular parallelepiped shape to accommodate and hold the circuit board, the housing including an engaging convex portion having a convex shape and an engaging concave portion having a concave shape which are formed facing each other in the in plane direction, the concave shape and the convex shape corresponding to each other, wherein:
one connection terminal of the first connection terminal and the second connection terminal is accommodated in the engaging convex portion of the housing, and the other connection terminal of the first connection terminal and the second connection terminal is accommodated in the engaging concave portion of the housing,
the first connection terminal and the second connection terminal being formed to have a corresponding shape capable of engaging with each other along a predetermined connection direction,
the electrical connection cassette is configured to be slidably engaged with another electrical connection cassette having another housing, another first terminal, another second terminal, another engaging convex portion, and another engaging concave portion such that when the electrical connection cassette is slidably engaged with the another electrical connection cassette, the engaging convex portion slides within the another engaging concave portion to provide mechanical connection between the electrical connection cassette and the another electrical connection cassette, and the first connection terminal engages the another second connection terminal to provide electrical connection between the electrical connection cassette and the another electrical connection cassette in a state in which the housing and the another housing adjacent thereto in the in-plane direction are concave-convex engaged along the predetermined connection direction.

2. The electrical connection cassette according to claim 1, wherein
with the first connection terminal and the second connection terminal constituting one set terminal,
a first set terminal, to which a predetermined power source is connected, and a second set terminal, which is connected to a ground, are provided.

3. The electrical connection cassette according to claim 1, wherein
the predetermined connection direction is a direction parallel to a main surface of the circuit board.

4. The electrical connection cassette according to claim 1, wherein the predetermined connection direction is a direction perpendicular to the main surface of the circuit board.

5. The electrical connection cassette according to claim 1, wherein the predetermined connection direction is a direction perpendicular to surfaces of the housing facing in the in-plane direction.

6. The electrical connection cassette according to claim 1, wherein:
the first connection terminal and the second connection terminal each is formed in a plate shape having a main surface orthogonal to each other, and
the predetermined connection direction is a direction parallel to the main surface of the first connection terminal and the main surface of the second connection terminal.

7. The electrical connection cassette according to claim 1, wherein
the first connection terminal and the second connection terminal each are formed in a shape having a main surface orthogonal to each other, and
the predetermined connection direction is a direction perpendicular to the main surface of the first connection terminal or the main surface of the second connection terminal.

8. The electrical connection cassette according to claim 1, wherein the first connection terminal and the second connection terminal are disposed on a virtual straight line along the in-plane direction.

9. The electrical connection cassette according to claim 1, wherein the first connection terminal and the second connection terminal are disposed on only one main surface of the circuit board.

10. The electrical connection cassette according to claim 1, wherein
a functional circuit is mounted on the circuit board, the functional circuit configuring one or more functions of a relay function for blocking or conducting an electrical path formed on the circuit board, a fuse function for blocking the electrical path when a time integral value of a current, for a given time, flowing through the electrical path formed on the circuit board is greater than or equal to a predetermined integral value, a voltage monitoring function for outputting a reset signal when a voltage of the electrical path formed on the circuit board is less than or equal to a predetermined voltage value, a recording function for recording a voltage value of the electrical path formed on the circuit board and/or a current value of a current flowing through the electrical path and other information and recording information acquired by communication with a higher system, a filter function for removing noise flowing through the electrical path formed on the circuit board, and a backup capacitor function for supplying power when power supply is shut down.

11. An electrical connection cassette comprising:
a circuit board;
a first connection terminal and a second connection terminal mounted on the circuit board and disposed facing each other in an in-plane direction which is a direction parallel to a main surface of the circuit board; and
a housing having a rectangular parallelepiped shape to accommodate and hold the circuit board, the housing including an engaging convex portion having a convex shape and an engaging concave portion having a concave shape which are formed facing each other in the in-plane direction, the concave shape and the convex shape corresponding to each other, wherein:
a plurality of connection terminals, each of which is one of the first connection terminal and the second connection terminal, are accommodated in the engaging convex portion of the housing, and
the same number of connection terminals, each of which is the other of the first connection terminal and the second connection terminal, as the number of the plurality of connection terminals are accommodated in the engaging concave portion of the housing,
the first connection terminal and the second connection terminal being formed to have a corresponding shape capable of engaging with each other along a predetermined connection direction,
the electrical connection cassette is configured to be slidably engaged with another electrical connection cassette having another housing, another first terminal, another second terminal, another engaging convex portion, and another engaging concave portion such that when the electrical connection cassette is slidably engaged with the another electrical connection cassette, the engaging convex portion slides within the another engaging concave portion to provide mechanical connection between the electrical connection cassette and the another electrical connection cassette, and the first connection terminal engages the another second connection terminal to provide electrical connection between the electrical connection cassette and the another electrical connection cassette and configured electrically conductive in a state in which the housing and the another housing adjacent thereto in the in-plane direction are concave-convex engaged along the predetermined connection direction.

\* \* \* \* \*